US012704585B2

(12) United States Patent
Manolakos et al.

(10) Patent No.: US 12,704,585 B2
(45) Date of Patent: Aug. 11, 2026

(54) DISTRIBUTING RECEIVE CHAINS FOR PARALLEL PROCESSING OF REFERENCE SIGNALS FROM MULTIPLE SOURCES

(71) Applicant: QUALCOMM Incorporated, San Diego, CA (US)

(72) Inventors: Alexandros Manolakos, Escondido, CA (US); Mukesh Kumar, Hyderabad (IN); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 18/546,035

(22) PCT Filed: Mar. 8, 2022

(86) PCT No.: PCT/US2022/071039

§ 371 (c)(1),
(2) Date: Aug. 10, 2023

(87) PCT Pub. No.: WO2022/226445

PCT Pub. Date: Oct. 27, 2022

(65) Prior Publication Data

US 2024/0142564 A1 May 2, 2024

(30) Foreign Application Priority Data

Apr. 21, 2021 (GR) .............................. 20210100284

(51) Int. Cl.
*G01S 5/02* (2010.01)
*G01S 5/00* (2006.01)

(52) U.S. Cl.
CPC .......... *G01S 5/0268* (2013.01); *G01S 5/0221* (2013.01); *G01S 5/0036* (2013.01); *G01S 5/0244* (2020.05)

(58) Field of Classification Search
CPC .... G01S 5/0268; G01S 5/0221; G01S 5/0244; G01S 5/0036
(Continued)

(56) References Cited

U.S. PATENT DOCUMENTS 9,651,653 B2 * 5/2017 Fischer ............... H04W 64/006
9,756,599 B2 * 9/2017 Fischer ................. G01S 1/0428
(Continued)

FOREIGN PATENT DOCUMENTS

CN 109644423 A 4/2019
EP 3497873 B1 * 9/2022 ............ H04L 5/005
(Continued)

OTHER PUBLICATIONS

European Search Report—EP24172692—Search Authority—Munich—Jul. 18, 2024.
(Continued)

*Primary Examiner* — Chuong P Nguyen
(74) *Attorney, Agent, or Firm* — Weaver Austin Villeneuve & Sampson LLP

(57) ABSTRACT

Described are methods, systems, and devices for processing a Positioning Reference Signal (PRS) or other reference signal usable for determining a position of a User Equipment (UE). In some aspects, a UE is configured to report to a network entity information indicating a number of receive (Rx) chains used to determine one or more positioning measurements, thereby indicating the amount of uncertainty in the positioning measurement(s) and the precision of a resulting position estimate. In some aspects, a UE is configured to receive multiple PRS signals that at least partially overlap in time and to process each PRS using a separate set of Rx chains to obtain positioning measurements. As part of the processing of a PRS, the UE may align a search window to the PRS. In this manner, different search windows can be
(Continued)

maintained for different PRS signals to maximize the signal-to-noise ratio of each PRS.

24 Claims, 13 Drawing Sheets

(58) Field of Classification Search
USPC .................................................. 342/450, 451
See application file for complete search history.

(56) References Cited

U.S. PATENT DOCUMENTS

| | | | | |
|---|---|---|---|---|
| 10,219,238 | B2 * | 2/2019 | Abdi | H04L 27/2675 |
| 10,256,957 | B2 * | 4/2019 | Park | H04L 27/2613 |
| 10,609,673 | B2 * | 3/2020 | Kumar | H04W 64/00 |
| 10,804,983 | B2 * | 10/2020 | Kumar | H04L 5/001 |
| 11,937,204 | B2 * | 3/2024 | Cui | H04L 5/0048 |
| 12,216,212 | B2 * | 2/2025 | Ma | G01S 5/06 |
| 2012/0299702 | A1 | 11/2012 | Edara et al. | |
| 2016/0345229 | A1 * | 11/2016 | Das | H04W 36/142 |
| 2018/0302891 | A1 * | 10/2018 | Bitra | H04W 64/00 |
| 2020/0059888 | A1 | 2/2020 | Cui et al. | |
| 2024/0159854 | A1 * | 5/2024 | Bengtsson | H04W 64/00 |
| 2024/0396681 | A1 * | 11/2024 | Zorgui | G01S 5/0027 |
| 2025/0323770 | A1 * | 10/2025 | Saha | H04L 5/0051 |

FOREIGN PATENT DOCUMENTS

| | | | | |
|---|---|---|---|---|
| EP | 4014611 | B1 * | 10/2024 | H04W 8/24 |
| TW | 202021393 | A | 6/2020 | |
| WO | WO 2016191126 | | 12/2016 | |
| WO | WO 2018190972 | | 10/2018 | |
| WO | WO 2019060493 | | 3/2019 | |
| WO | WO 2019212859 | | 11/2019 | |
| WO | 2019240771 | A1 | 12/2019 | |

OTHER PUBLICATIONS

International Search Report and Written Opinion PCT/US2022/071039—ISA/EPO—Sep. 28, 2022.
Partial International Search Report—PCT/US2022/071039 ISA/EPO—Jun. 24, 2022.
Taiwan Search Report—EP111108617—TIPO—Jun. 20, 2025.

* cited by examiner

1100

1102

Receive a first PRS from a first transmitter device and during a first PRS occasion, using a first set of antenna elements

1104

Receive a second PRS from a second transmitter device during a second PRS occasion and using a second set of antenna elements, where the first set of antenna elements are separate from the second set of antenna elements, each antenna element is associated with an Rx chain, the Rx chain is configured to process an Rx signal corresponding to a PRS received by a single antenna element or a combined Rx signal corresponding to a PRS received by a group of antenna elements, and where due to the first PRS occasion at least partially overlapping with the second PRS occasion, the first PRS and the second PRS are received concurrently

1106

Process Rx signals or a combined Rx signal corresponding to the first PRS, using one or more Rx chains associated with the first set of antenna elements;
Process Rx signals or a combined Rx signal corresponding to the second PRS, using one or more Rx chains associated with the second set of antenna elements

1108

Determine positioning measurements using: (i) results of the processing of the Rx signals or combined Rx signal corresponding to the first PRS and (ii) results of the processing of the Rx signals or combined Rx signal corresponding to the second PRS

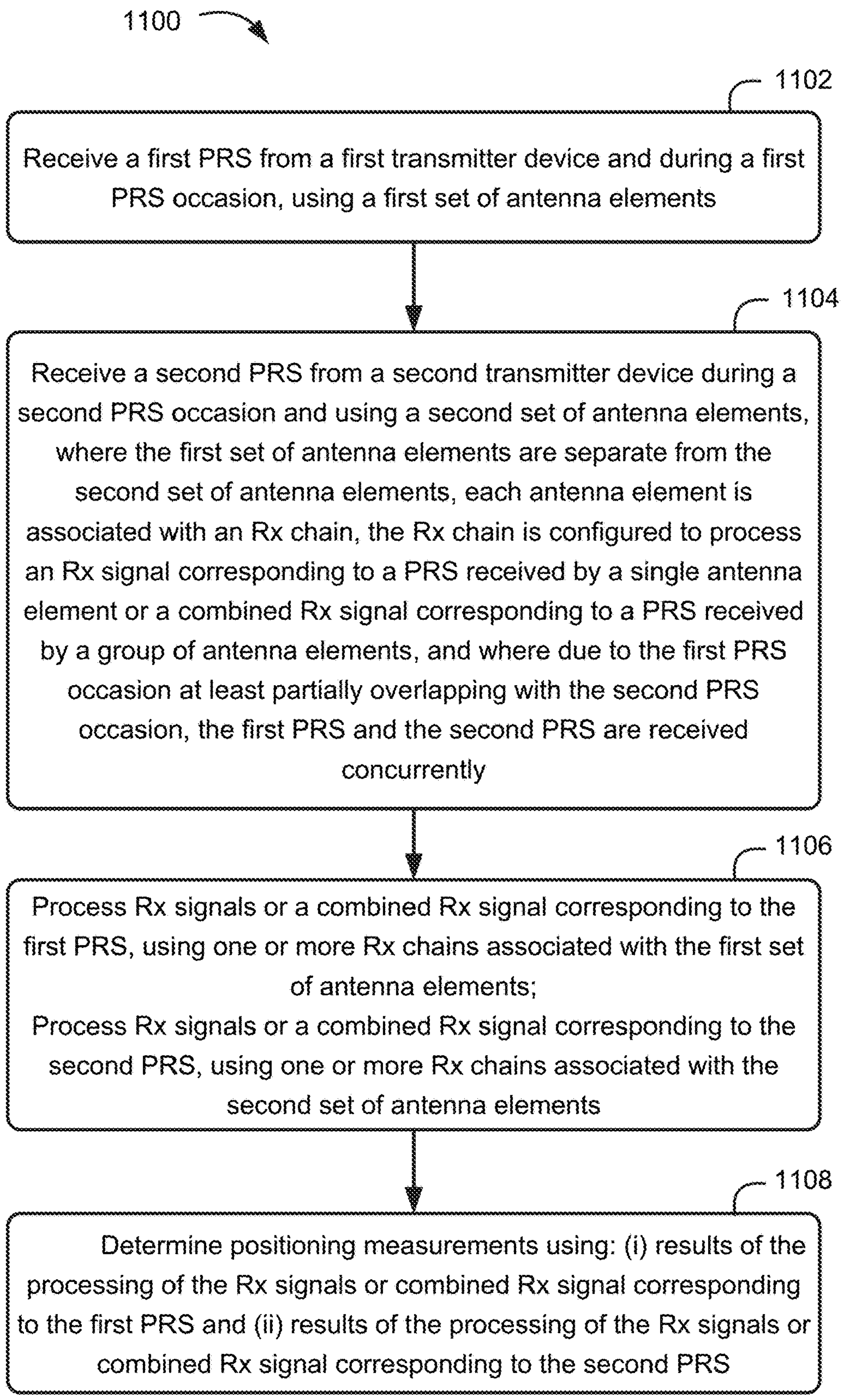

FIG. 11

DISTRIBUTING RECEIVE CHAINS FOR PARALLEL PROCESSING OF REFERENCE SIGNALS FROM MULTIPLE SOURCES

RELATED APPLICATIONS

This application is a National Phase entry of International Application No. PCT/US2022/071039, filed Mar. 8, 2022, entitled "DISTRIBUTING RECEIVE CHAINS FOR PARALLEL PROCESSING OF REFERENCE SIGNALS FROM MULTIPLE SOURCES", which claims the benefit of Greece application No. 20210100284, filed Apr. 21, 2021, entitled "DISTRIBUTING RECEIVE CHAINS FOR PARALLEL PROCESSING OF REFERENCE SIGNALS FROM MULTIPLE SOURCES", both of which are assigned to the assignee hereof and incorporated herein in their entirety by reference.

BACKGROUND

1. Field of Invention

The present invention relates generally to the field of wireless communications, and more specifically to processing of reference signals received by a User Equipment (UE) from multiple sources, for example, Positioning Reference Signals (PRSs) from a plurality of Transmission Reception Points (TRPs).

2. Description of Related Art

It is sometimes useful to determine the location of a UE. For example, a software application executing on a UE may use the location of the UE (e.g., a latitude-longitude pair) to calculate a route from the location of the UE to another location. The location of a UE can be determined using different position methods. Some position methods involve communications between the UE and one or more satellites (e.g., a satellite of a Global Navigation Satellite System (GNSS)) and/or one or more terrestrial entities (e.g., a TRP or base station). For instance, Positioning Reference Signals (PRSs) are sometimes broadcast by different TRPs and processed by a UE that receives the PRS signals in order to estimate the location of the UE based on measurements performed by the UE, such as the difference between arrival times of the PRS signals from the different TRPs.

When a PRS is received by a UE, the PRS is decoded to extract information that assists the UE in performing a measurement. Each PRS is usually decoded using a pair of receive (Rx) chains associated with a first Rx antenna and a second Rx antenna. Depending on the environment in which the UE is located, the UE may sometimes be unable to successfully decode a PRS using one or both Rx chains. For example, deep fading of a PRS received by the first Rx antenna can occur when the PRS is attenuated due to weather conditions, physical obstacles, or multipath propagation of the PRS due to lack of direct line-of-sight. When a PRS cannot be decoded, this can adversely affect the accuracy of the resulting location determination since the UE may have fewer measurements to rely upon.

Additionally, the timing with which the decoding of a PRS is performed is sometimes dictated by a serving or reference cell with which the UE is in communication. If a PRS is transmitted by a source located remotely from the serving/reference cell (e.g., a TRP associated with a neighbor cell), there may be a delay between when the UE expects to receive the PRS and when the PRS is actually received.

If the UE attempts to decode the PRS according to the timing of the serving/reference cell, this may reduce the signal-to-noise ratio (SNR) of the PRS, possibly to the point where the PRS cannot be successfully decoded. Alternatively, the UE can align a search window to each PRS so that PRS signals are decoded sequentially and with higher SNR, but this would increase processing time.

BRIEF SUMMARY

The present disclosure relates to techniques for processing of reference signals received by a User Equipment (UE) from multiple sources, for example, Positioning Reference Signals (PRSs) from a plurality of Transmission Reception Points (TRPs). Techniques are described for determining the number of receive (Rx) chains used by a UE to perform one or more positioning measurements, for example, one or more Time of arrival (TOA) measurements and/or one or more Reference Signal Time Difference (RSTD) measurements.

In some aspects, a UE is configured to report how many Rx chains were used to perform one or more positioning measurements, via a communication sent from the UE to an entity that calculates the UE's location using the positioning measurements or that performs downstream processing based on the location of the UE as determined by the UE according to the positioning measurements. For instance, the UE may report the number of Rx chains used to a base station, location server, or other network entity that determines a Dilution of Precision (DOP) or other metric indicating a degree of uncertainty in the location of the UE. In some instances, the network entity that the UE reports to is another UE.

In some aspects, a UE is configured to determine the DOP or other metric indicating the degree of uncertainty in the location of the UE. The UE may take the DOP or other metric into consideration when using the location of the UE, for example, when updating a display to show the UE's current location. The UE may also reconfigure itself to receive additional reference signals or perform other actions depending on the value of the DOP or other metric.

In some aspects, a UE is configured to perform processing of PRS signals sent from different sources. The PRS signals may be received during PRS occasions that at least partially overlap in time so that the PRS signals are received concurrently. Consequently, the UE may perform parallel processing of PRS signals while maintaining a positioning session between the UE and a location server, LMF, or other network entity that the UE is in communication with. During the positioning session, the UE may receive and process other signals that are not used for positioning. Such other signals could include, for example, voice or data signals communicated to the UE via a serving cell. Generally, the processing of such other signals is based on timing parameters (e.g., symbol boundaries) associated with a serving or reference cell. However, the processing of the PRS signals may be performed based on other timing parameters. For instance, the UE may define a search window for decoding a PRS from a TRP or other PRS source, where the search window is not aligned with any of the symbol boundaries of the serving/reference cell. In particular, a separate search window can be defined for each TRP or PRS source so that the search window is aligned to the actual receive time of a PRS from the TRP/source, thereby maximizing the signal-to-noise ratio of the PRS. Additionally, the processing of the PRS signals may involve allocating a separate set of Rx chains for each PRS signal. For instance, the UE may include four Rx chains and use two Rx chains for decoding a PRS signal from a first TRP and the other two Rx chains for decoding a PRS signal from a second TRP. Receiving and processing PRS signals concurrently can significantly reduce the amount of time spent in computing the location of the UE (sometimes referred to as establishing a position fix).

BRIEF DESCRIPTION OF THE DRAWINGS

FIG. 11 is a flow diagram of a method for performing positioning measurements using multiple Rx chains, according to an embodiment.

Figure 1:
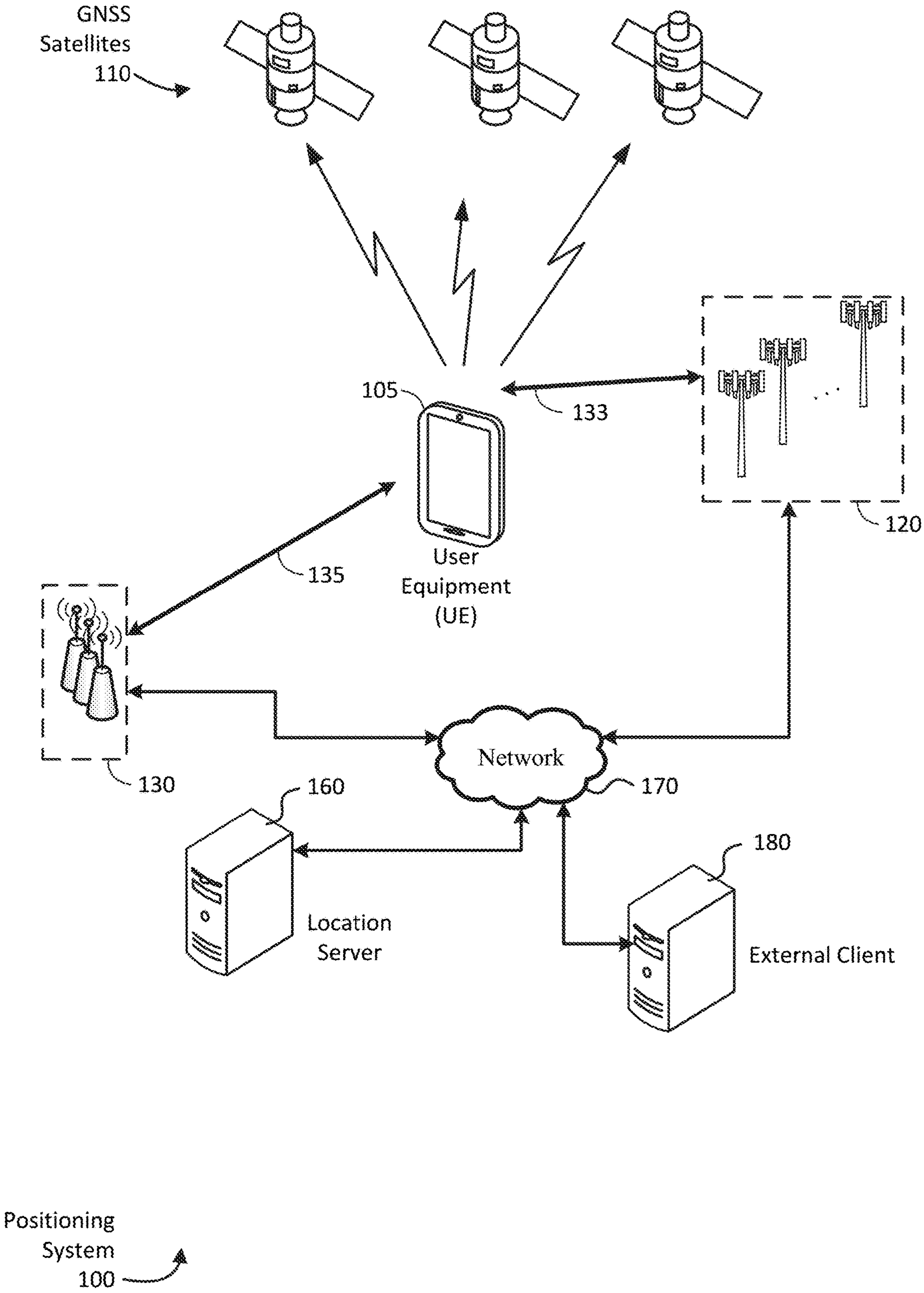
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as **110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c***).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

An RF signal received by a UE can be a reference signal usable for determining a position of the UE, for example, based on positioning measurements derived using the reference signal plus additional reference signals from multiple sources in different locations relative to the UE. Such reference signals are also referred to herein as "positioning signals". Embodiments are described in which a reference signal is a PRS signal (or simply "PRS"). However, embodiments described herein can be applied toward other types of reference signals that are usable for determining position, for example, a Synchronization Signal Block (SSB), a Tracking Reference Signal (TRS), a Channel State Information Reference Signal (CSI-RS), and/or a Demodulation Reference Signal (DMRS).

In some embodiments, a reference signal can be received using multiple antenna elements, each antenna element being associated with a receive (Rx) chain. A UE can be equipped with multiple antenna elements and multiple Rx chains. Each Rx chain can include hardware and/or software components (e.g., a processing pipeline including digital and/or analog circuitry) configured to perform signal processing on an Rx signal corresponding to a PRS or other reference signal received by a single antenna element. Alternatively, in some instances, an Rx chain may be configured to process a combined Rx signal corresponding to a PRS/reference signal received by a group of antenna elements. For example, two or more antenna elements may form a receive panel configured to receive a PRS from a particular source. Each antenna element in the panel may generate a separate Rx signal that is combined with Rx signals of other antenna elements in the panel to produce a combined Rx signal that is then processed using an Rx chain associated with the panel. Accordingly, a UE usable for implementing one or more embodiments described herein can include an Rx chain associated with a single antenna element, an Rx chain associated with a group of antenna elements, or both.

Embodiments described herein can be implemented using any positioning system in which a UE is communicatively coupled to one or more sources of reference signals. An example of a positioning system suitable for implementing one or more embodiments is shown in FIG. 1. The positioning system in FIG. 1 is provided merely as an example and to illustrate how different entities can interact with a UE in connection with determining the location of the UE. In practice, a positioning system implemented according to an embodiment described herein may include more or fewer components than depicted in FIG. 1.

FIG. 1 is a simplified illustration of a positioning system 100 in which a UE 105, location server (LS) 160, and/or other components of the positioning system 100 can use the techniques provided herein for determining an estimated location of UE 105, according to an embodiment. The techniques described herein may be implemented by one or more components of the positioning system 100. The positioning system 100 can include a UE 105, one or more satellites 110 (also referred to as space vehicles (SVs)) for a Global Navigation Satellite System (GNSS) such as the Global Positioning System (GPS), base stations 120, access points (APs) 130, LS 160, network 170, and external client 180. Generally, the positioning system 100 can estimate the location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed below in connection with FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that the network 170 is a 5G network. An AP 130 may comprise a Wi-Fi AP or a Bluetooth® AP, for example. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with Internet-connected devices, including LS 160, using a second communication link 135.

As used herein, the term "base station" may generically refer to a single physical transmission point, or multiple co-located physical transmission points, which may be located at a base station 120. Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be a serving base station receiving a measurement report from the UE 105 and a neighbor base station whose reference RF signals the UE 105 is measuring.

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, a location of the UE 105 estimated at least in part based on measurements of RF signals communicated between the UE 105 and one or more other UEs (not shown in FIG. 1), which may be mobile. Direct communication between UEs in this manner may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

Figure 2:
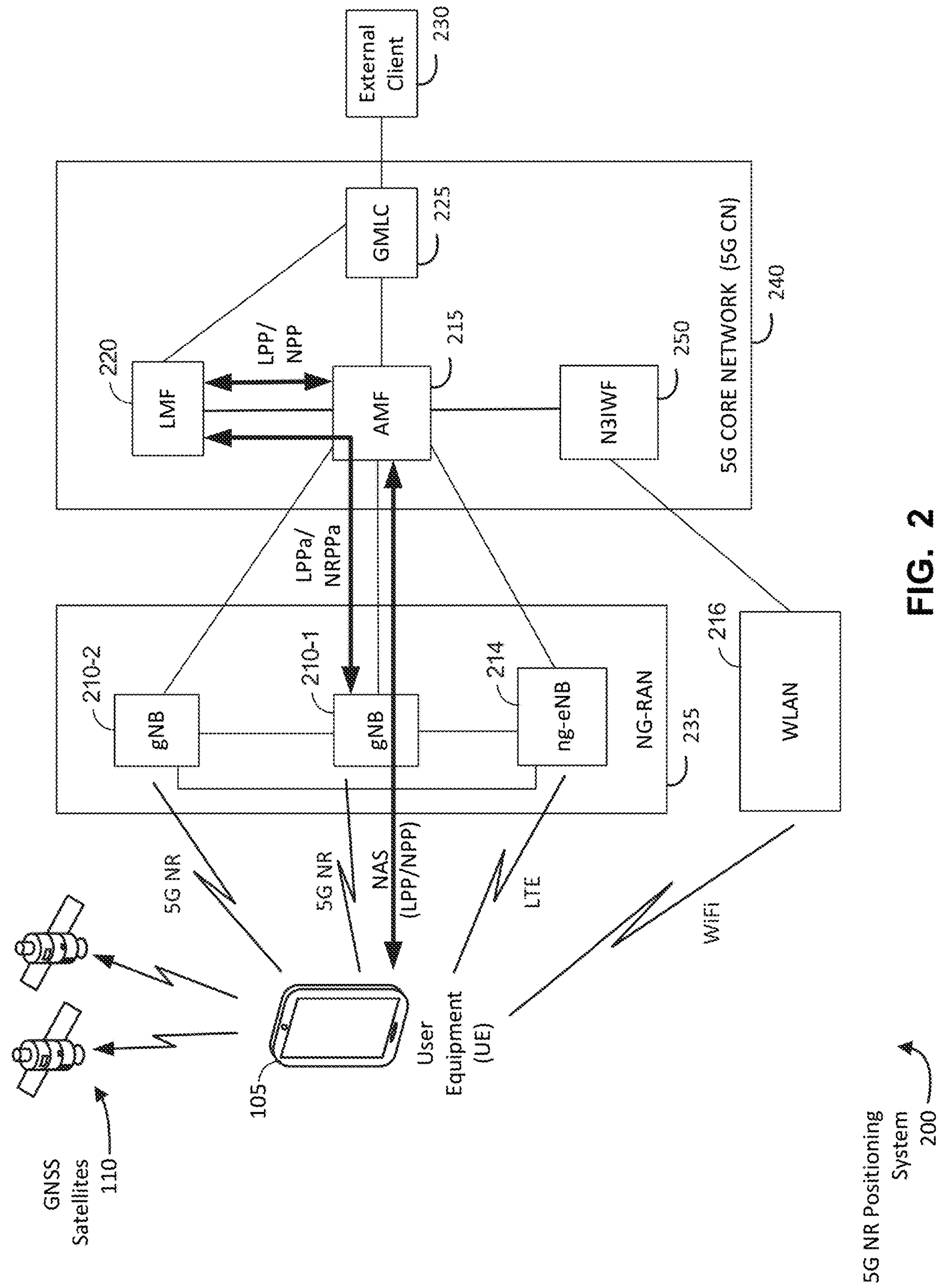
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with LS 160) to implement one or more position methods. Here, the 5G NR positioning system 200 comprises a UE 105, a 5G NR network comprising a Next Generation (NG) Radio Access Network (RAN) (NG-RAN) 235, and a 5G Core Network (5G CN) 240. A 5G network may also be referred to as an NR network; NG-RAN 235 may be referred to as a 5G RAN or as an NR RAN; and 5G CN 240 may be referred to as an NG Core network. Standardization of an NG-RAN and 5G CN is ongoing in 3GPP. Accordingly, NG-RAN 235 and 5G CN 240 may conform to current or future standards for 5G support from 3GPP. The 5G NR positioning system 200 may further utilize information from GNSS satellites 110 from a GNSS system like Global Positioning System (GPS) or similar system. Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and Mobility Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and comprise a Transmission Reception Point (TRP), and may include NR NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). Access to the 5G network is provided to UE 105 via wireless communication between the UE 105 and one or more of the gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signals (PRSs)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g. AMF 215 as shown in FIG. 2) and not via N3IWF 250—e.g. if WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term “access node,” as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information for multiple RATs from the LMF 220, take measurements for one of the multiple RATs (e.g., measurements of the UE 105) and/or obtain measurements from the UE 105 that are transferred to the access node using one or more of the multiple RATs. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA), Real Time Kinematics (RTK), Precise Point Positioning (PPP), Differential GNSS (DGNSS), ECID, angle of arrival (AOA), angle of departure (AOD), WLAN positioning, and/or other positioning procedures and methods. The LMF 220 may also process location services requests for the UE 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220, or may forward the location request directly to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, the LMF 220 may communicate with the gNBs 210 and/or with the ng-eNB 214 using the LPPa protocol (which also may be referred to as NRPPa or NPPa). LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using the LPP protocol. LMF 220 and UE 105 may also or instead communicate using an LPP protocol (which, in NR, also may be referred to as NRPP or NPP). Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or Enhanced Cell ID (ECID). The LPPa protocol may be used to support positioning of UE 105 using network based position methods such as ECID (e.g., when used with measurements obtained by a gNB 210 or ng-eNB 214) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or positioning measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

With a UE-assisted position method, UE 105 may obtain positioning measurements and send the measurements to a location server (e.g., LMF 220) for computation of a location estimate for UE 105. Positioning measurements may include, for example, one or more of a Received Signal Strength Indication (RSSI), Round Trip signal propagation Time (RTT), Reference Signal Receive Power (RSRP), Reference Signal Received Quality (RSRQ), Time of Arrival (TOA), Reference Signal Time Difference (RSTD), AOA, Differential AOA (DAOA), AOD, or Timing Advance (TA) for gNBs 210, ng-eNB 214, and/or one or more access points for WLAN 216. The positioning measurements may also or instead include measurements of RAT-independent position methods such as GNSS (e.g., GNSS pseudorange, GNSS code phase, and/or GNSS carrier phase for GNSS satellites 110), WLAN, etc.

With a UE-based position method, UE 105 may obtain positioning measurements (e.g., which may be the same as or similar to positioning measurements for a UE assisted position method) and may further compute a location of UE 105 (e.g., with the help of assistance data received from a location server such as LMF 220 or broadcast by gNBs 210, ng-eNB 214, or WLAN 216). Further, in some instances, a UE-based position method may involve sidelink communication with another UE.

With a network based position method, one or more base stations (e.g., gNBs 210 and/or ng-eNB 214), one or more APs (e.g., in WLAN 216), or N3IWF 250 may obtain positioning measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

In a 5G NR positioning system 200, some positioning measurements taken by the UE 105 (e.g., AOA, AOD, TOA) may use RF reference signals received from base stations 210 and 214. These signals may comprise PRS signals, which can be used, for example, to execute OTDOA, AOD, and RTT-based positioning of the UE 105. Other reference signals that can be used for positioning may include Cell-specific Reference Signal (CRS), Channel State Information Reference Signal (CSI-RS), synchronization signals, etc. Moreover, the signals may be transmitted in a transmit (Tx) beam (e.g., using beamforming techniques), which may impact angular measurements, such as AOD.

Figure 3:
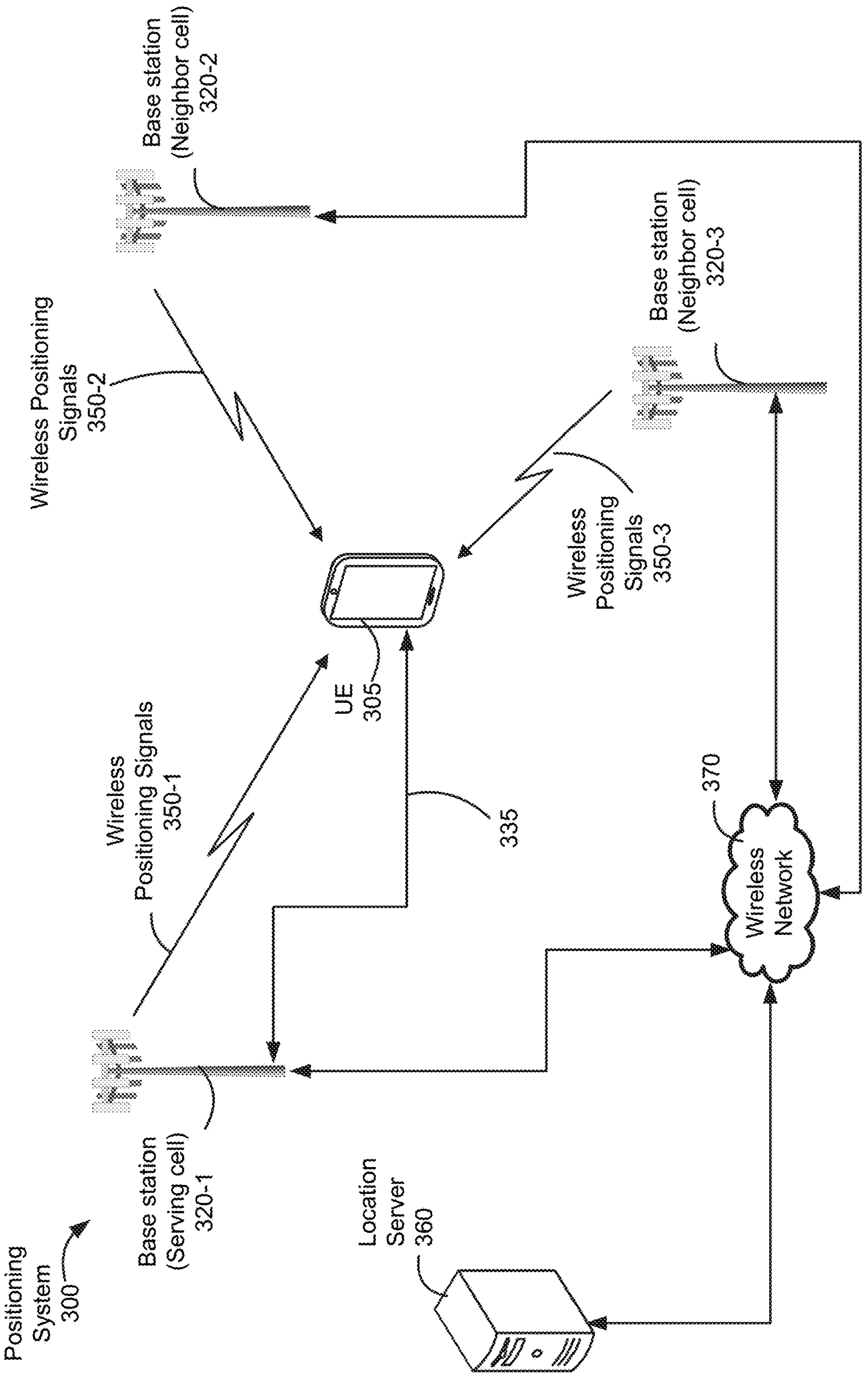
FIG. 3 is a simplified block diagram of a positioning system that can embody the positioning system of FIG. 1 or FIG. 2.

FIG. 3 is a simplified block diagram of a positioning system 300 that can embody the positioning system 100 of FIG. 1 or the positioning system 200 of FIG. 2. As shown in FIG. 3, a UE 305 may access a wireless network 370 via a communication link 335 that couples the UE 305 to a base station 320-1. Wireless network 370 may correspond to, for example, the network 170 in FIG. 1 or WLAN 216 in FIG. 2. In the example of FIG. 3, the base station 320-1 is associated with a serving cell, and the communication link 335 represents a connection with the serving cell. The UE 305 may establish different types of sessions with any number of entities. For instance, UE 305 may establish a session with the serving cell to access cellular voice and/or data services. The session between the UE 305 and the serving cell can be initiated by either the serving cell or the UE 305 and, in some instances, may have been transferred as a result of a handover procedure from a previous serving cell. The UE 305 can also establish a session with an entity in connection with location services, e.g., a positioning session. For instance, UE 305 may periodically establish an LTE Positioning Protocol (LPP) session with the location server 360. During the LPP session, the UE 305 may communicate PRS-based measurements to location server 360 to enable the location server 360 to calculate the position of the UE 305 using the measurements. Location server 360 may, in turn, communicate the calculated position to the UE 305 and/or perform some action based on the calculated position.

As depicted in FIG. 3, UE 305 may also be in wireless communication with other base stations 320 (e.g., base stations 320-2 and 320-3). These additional base stations 320 may be associated with neighbor cells that cover a different geographic area. Thus, the base stations 320-2 and 320-3 may be remotely located from the serving cell associated with base station 320-1. In some instances, multiple base stations that are not co-located with each other may be associated with the same cell. However, for the sake of illustration, each of the base stations 320 in FIG. 3 can be assumed to be in a different location and associated with a different cell.

UE 305 may receive one or more wireless positioning signals 350 from each of the base stations 320. For example, wireless positioning signals 350 can include DL-PRS signals that are broadcast by a base station 320 or sent by the base station 320 upon request from UE 305. Base stations 320-1, 320-2, and 320-3 may each transmit their own wireless positioning signals 350-1, 350-2, and 350-3, respectively. In some embodiments, such as the embodiment of FIG. 2, each of the base stations 320-1, 320-2, and 320-3 may correspond to a separate TRP. A base station 320 may transmit its wireless positioning signals using specific time or frequency resources so as not to interfere with wireless positioning signals from other base stations 320. In some embodiments, the wireless positioning signals 350 are time and/or frequency multiplexed. Although not shown in FIG. 3, wireless positioning signals can optionally include uplink signals transmitted from UE 305 to one or more base stations 320.

UE 305 may be configured to perform positioning measurements using the wireless positioning signals 350 in support of a location determination procedure. For instance, UE 305 may capture a TOA of each wireless positioning signal 350 using a local clock, measure an RSTD of the wireless positioning signal 350, and/or perform other types of positioning measurements depending on the position method used for the location determination procedure. The following is a non-exhaustive list of positioning measurements based on downlink or uplink reference signals and the corresponding position methods supported by those positioning measurements:

DL-RSTD: supports DL-TDOA;

DL-PRS RSRP (Reference Signal Received Power): supports DL-TDOA, DL-AoD (Angle of Departure), and Multi-RTT (multiple Round-Trip-Time);

UE Rx-Tx time difference: supports Multi-RTT; and

SS-RSRP (Synchronization Signal RSRP), SS-RSRQ (Synchronization Signal Reference Signal Received Quality), CSI-RSRP (Channel State Information RSRP), and CSI-RSRQ: each supports E-CID (Enhanced Cell ID).

As discussed earlier, UE-based positioning and/or network based positioning may be supported. Thus, the positioning measurements obtained by the UE 305 can be processed by the UE 305 to locally calculate the UE's location. Alternatively, the positioning measurements can be communicated to another device configured to calculate the UE's location based on the positioning measurements. For instance, in some implementations, the UE's location is calculated by the location server 360 based on positioning measurements obtained by UE 305 from the wireless positioning signals 350. In a 5G implementation, location server 360 can correspond to an LMF such as the LMF 220 in FIG. 2. Further, the location server 360 can be integrated into a base station (e.g., gNB 210-1, gnB 210-2, ng-eNB 214) or a standalone server.

In addition to receiving wireless positioning signals 350, the UE 305 can send and/or receive other types of signals such as synchronization signals or signals that carry voice or data. For instance, UE 305 may use the communication link 335 to, concurrently with performing positioning measurements based on the wireless positioning signals 350, conduct a telephone call or download a web page. In general, the wireless positioning signals 350 and other signals communicated between the UE 305 and the base stations 320 may be communicated using radio frames, for example, radio frames structured as shown in FIG. 4.

Figure 4:
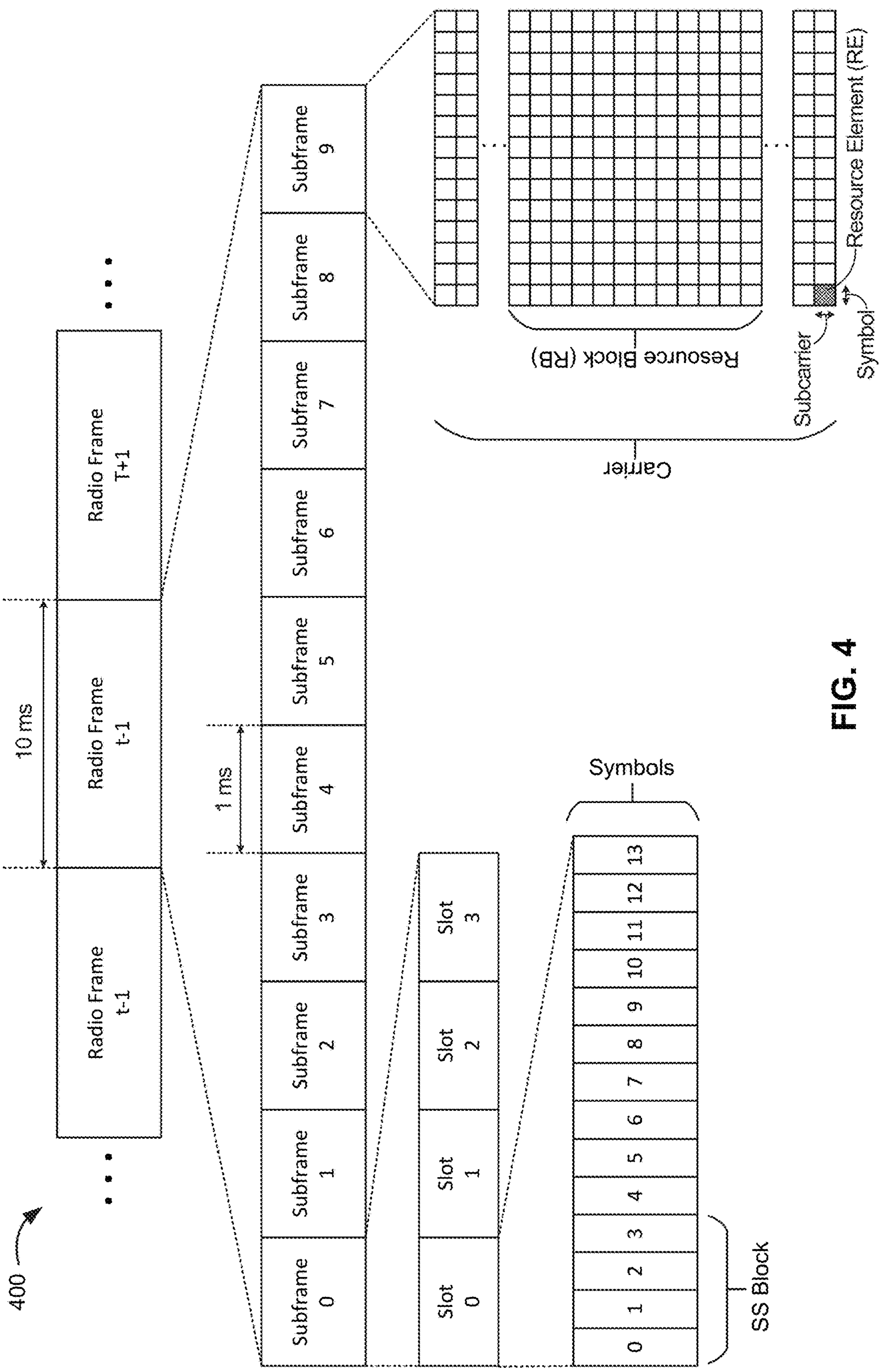
FIG. 4 is a diagram showing an example of a frame structure for NR and associated terminology.

FIG. 4 is a diagram showing an example of a frame structure 400 for NR and associated terminology, which can serve as the basis for physical layer communication between a UE and base stations (e.g., between UE 305 and base stations 320 in FIG. 3). The transmission timeline for each of the downlink and uplink communications may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the sub carrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 4 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 4. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 5:
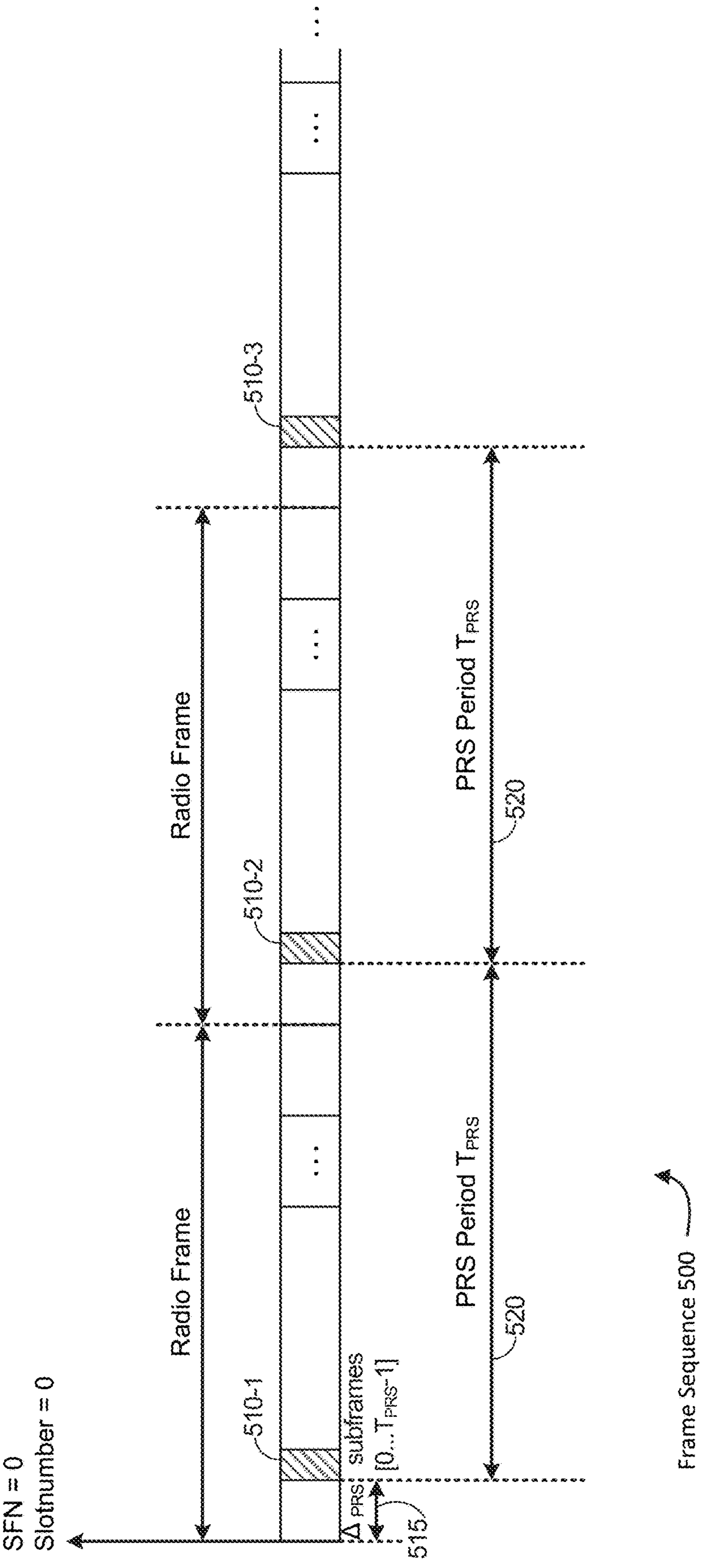
FIG. 5 is a diagram showing an example of a radio frame sequence with Positioning Reference Signal (PRS) positioning occasions.

FIG. 5 is a diagram showing an example of a radio frame sequence 500 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition." Subframe sequence 500 may be applicable to broadcast of PRS signals (DL-PRS signals) from base stations 120 in positioning system 100 or base stations 320 in positioning system 300. The radio frame sequence 500 may be used in 5G NR (e.g., in 5G NR positioning system 200) and/or in LTE. Similar to FIG. 4, time is represented horizontally (e.g., on an X axis) in FIG. 5, with time increasing from left to right. Frequency is represented vertically (e.g., on a Y axis) with frequency increasing (or decreasing) from bottom to top.

FIG. 5 shows how PRS occasions 510-1, 510-2, and 510-3 (collectively and generically referred to herein as positioning occasions 510) are determined by a System Frame Number (SFN), a cell-specific subframe offset ($\Delta_{PRS}$) 515, and the PRS Periodicity ($T_{PRS}$) 520. The cell-specific PRS subframe configuration may be defined by a "PRS Configuration Index," $I_{PRS}$, included in assistance data (e.g., OTDOA assistance data), which may be defined by governing 3GPP standards. The cell-specific subframe offset ($\Delta_{PRS}$) 515 may be defined in terms of the number of subframes transmitted starting from System Frame Number (SFN) 0 to the start of the first (subsequent) PRS positioning occasion.

A PRS may be transmitted by wireless nodes (e.g., base stations 120) after appropriate configuration (e.g., by an Operations and Maintenance (O&M) server). A PRS may be transmitted in special positioning subframes or slots that are grouped into positioning occasions 510. For example, a PRS positioning occasion 510-1 can comprise a number $N_{PRS}$ of consecutive positioning subframes where the number $N_{PRS}$ may be between 1 and 160 (e.g., may include the values 1, 2, 4 and 6 as well as other values). PRS occasions 510 may be grouped into one or more PRS occasion groups. As noted, PRS occasions 510 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some aspects, $T_{PRS}$ may be measured in terms of the number of subframes between the start of consecutive positioning occasions.

In some aspects, when a UE receives a PRS configuration index $I_{PRS}$ in the assistance data for a particular cell (e.g., base station), the UE may determine the PRS Periodicity $T_{PRS}$ 520 and cell-specific subframe offset ($\Delta_{PRS}$) 515 using stored indexed data. The UE may then determine the radio frame, subframe, and slot when a PRS is scheduled in the cell. The assistance data may be determined by, for example, a location server (e.g., LS 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 515) relative to other cells in the network that use a different frequency. In SFN-synchronous networks all wireless nodes (e.g., base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS occasions 510 of the reference and neighbor cells for OTDOA positioning, if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

In the 5G NR positioning system 200 illustrated in FIG. 2, a TRP (e.g., gNB 210, ng-eNB 214, WLAN 216) may transmit frames, or other physical layer signaling sequences, supporting PRS signals (i.e. a DL-PRS) according to frame configurations as previously described, which may be measured and used for position determination of the UE 105. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

In some aspects, OTDOA assistance data may be provided to a UE by a location server (e.g., LS 160) for a "reference cell" (which also may be called "reference resource"), and one or more "neighbor cells" or "neighboring cells" (which also may be called a "target cell" or "target resource"), relative to the reference cell. For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to OTDOA or some other position method. PRS-based positioning by a UE 105 may be facilitated by indicating the serving cell for the UE 105 in the OTDOA assistance data (e.g., with the reference cell indicated as being the serving cell).

In some aspects, OTDOA assistance data may also include "expected Reference Signal Time Difference (RSTD)" parameters, which provide a UE with information about the RSTD values the UE is expected to measure at its current location between the reference cell and each neighbor cell, together with an uncertainty of the expected RSTD parameter. The expected RSTD, together with the associated uncertainty, may define a search window for the UE within which the UE is expected to measure the RSTD value. OTDOA assistance information may also include PRS configuration information parameters, which allow a UE to determine when a PRS positioning occasion occurs on signals received from various neighbor cells relative to PRS positioning occasions for the reference cell, and to determine the PRS sequence transmitted from various cells in order to measure a signal ToA or RSTD.

Using the RSTD measurements, the known absolute or relative transmission timing of each cell, and the known position(s) of wireless node physical transmitting antennas for the reference and neighboring cells, the UE position may be calculated (e.g., by the UE 105 or by the LS 160). More particularly, the RSTD for a neighbor cell "k" relative to a reference cell "Ref," may be given as ($ToA_k - ToA_{Ref}$), where the ToA values may be measured modulo one subframe duration (1 ms) to remove the effects of measuring different subframes at different times. ToA measurements for different cells may then be converted to RSTD measurements and sent to the location server 101 by the UE 105. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE position may be determined.

Figure 6:
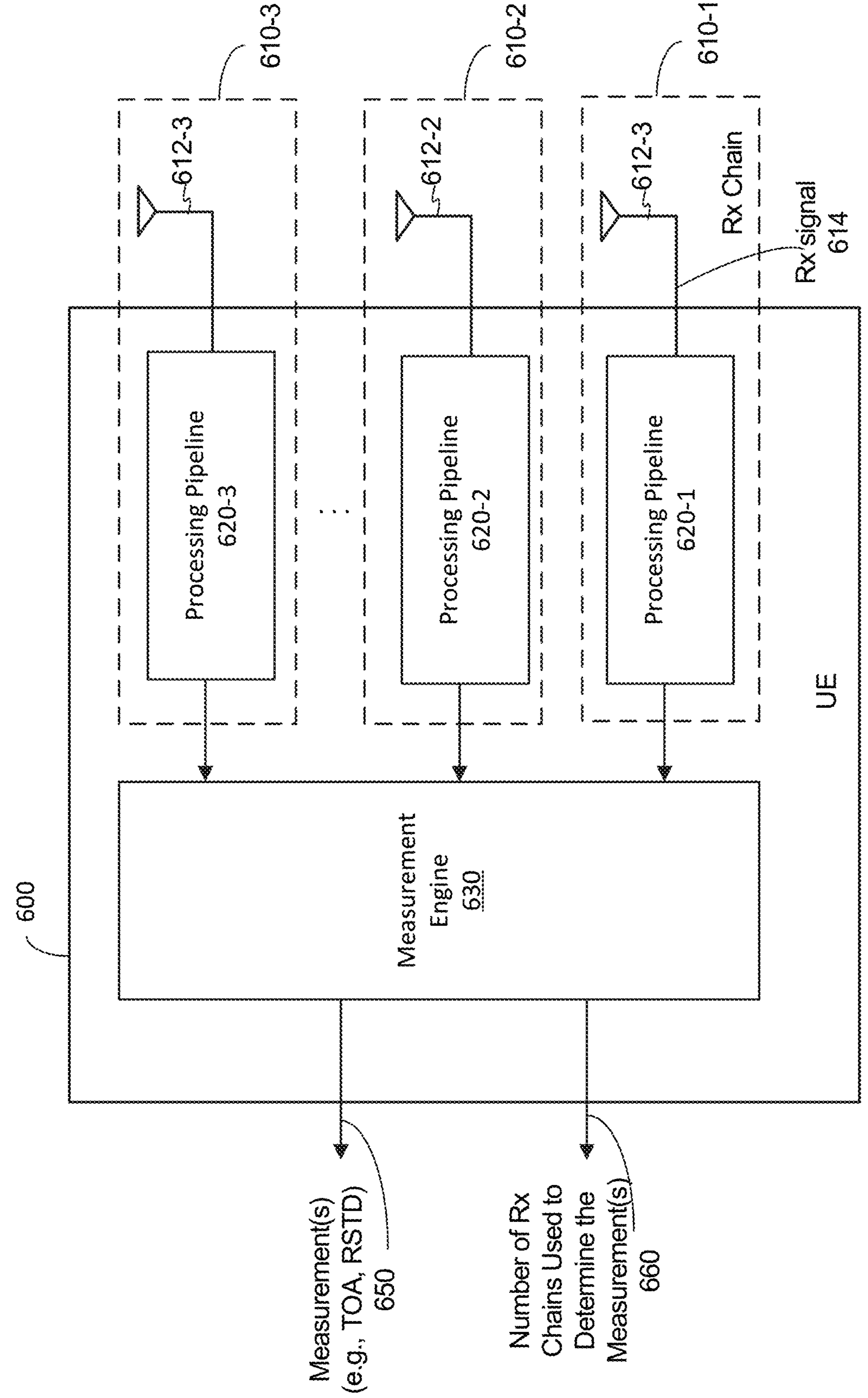
FIG. 6 is a simplified block diagram illustrating receive components of a UE according to an embodiment.

FIG. 6 is a simplified block diagram illustrating receive components of a UE 600 according to an embodiment. UE 600 includes multiple Rx chains 610-1, 610-2, 610-3. Although only three Rx chains are shown, a UE can have more or fewer Rx chains, e.g., four, eight, or more Rx chains. When multiple Rx chains are available, the Rx chains can be used for MIMO communication. Another use for multiple Rx chains is to increase signal diversity by receiving and processing the same signal through different Rx chains in order to achieve signal gain through diversity (e.g., spatial diversity, time diversity, or another form of diversity). Spatial diversity is achieved when a signal is transmitted and received through different propagation paths, such as in a multipath propagation scenario. Antennas that are spaced apart can be used to receive and decode the signal when it propagates along the different paths. The results of decoding the signal using multiple antennas can be combined to improve reception of the signal. Time diversity may involve transmitting multiple instances of the same signal at different times, which helps to mitigate time-varying signal fading due to changes in environmental conditions that arise, for example, when the UE is moving relative to the source of the signal, obstacles are present, or there is intermittent interference. As discussed below, multiple Rx chains can also be used to reduce processing time and increase signal-to-noise ratio (SNR) in connection with determining the location of a UE based on DL-PRS or other types of reference signals.

Generally, an Rx chain comprises processing components configured to perform signal processing on an Rx signal from one or more antennas (e.g., an Rx signal 614). In the example of FIG. 6, the processing components are arranged in a processing pipeline. For instance, each Rx chain 610 can include an antenna 612 and a processing pipeline 620 associated with the antenna 612. The antennas 612 may together form an antenna array and may, in some instances, also be used for transmission purposes. A processing pipeline 620 can include hardware and/or software components configured to perform signal processing on an Rx signal corresponding to a reference signal (e.g., a PRS) received by the antenna that is associated with the Rx chain. For example, each processing pipeline 620 may include an analog-to-digital converter configured to convert an analog Rx signal (e.g., the Rx signal 614) into a digital signal and demodulation circuitry configured to recover a baseband signal by demodulating the Rx signal using a reference carrier signal. Generally, processing within a processing pipeline involves a sequence of operations performed sequentially or in stages (e.g., analog-to-digital conversion followed by demodulation, as discussed above). In some instances, processing within an Rx chain may involve operations that are performed concurrently, e.g., some stages may overlap.

In the example of FIG. 6, each Rx chain is associated with a separate antenna. As such, the antenna with which an Rx chain is associated can be considered to be part of the Rx chain itself, as shown in FIG. 6. However, this is not necessarily the case in every instance. For example, in some embodiments, a UE may include two or more panels, each panel including two or more receive antennas whose respective Rx signals are combined (e.g., in the analog domain using a summation operation) into a combined Rx signal for processing by an Rx chain associated with the panel. The combined Rx signal can be generated for input to an Rx chain or generated as part of the signal processing performed by the Rx chain. For example, an Rx chain can include an analog summation circuit along with other signal processing components such as an analog-to-digital converter, components for converting an Rx signal or combined Rx signal into a baseband signal, and the like.

Further, each processing pipeline 620 may include one or more processing units (e.g., a general-purpose processor or a digital signal processor (DSP)) configured to decode a received signal (e.g., a single Rx signal or a combined Rx signal) or a signal derived therefrom (e.g., a baseband signal) by applying a search window. As discussed above in the context of an RSTD measurement, a search window can be defined, based on an expected RSTD parameter and an uncertainty of the expected RSTD parameter, as a window within which a UE is expected to measure an RSTD value. More generally, a search window can be any window within which a UE is expected to perform a measurement using a received reference signal. Accordingly, it is understood that search windows are not limited to RSTDs and may instead correspond to time periods within which PRS or other reference signals are expected to be processed using one or more Rx chains.

In some embodiments, a search window is a time period over which a Fast Fourier Transform (FFT) is applied by the one or more processing units of an Rx chain to samples of a reference signal being decoded. Thus, according to some aspects, a search window can be an FFT window. For instance, if a reference signal is transmitted using OFDM, the reference signal may be time-sampled and then converted into the frequency domain by applying an FFT after the reference signal has been down-converted to a baseband frequency from its RF carrier frequency. The results of the FFT can be used to identify the center frequencies of individual sub-carriers and recover the original data stream corresponding to the reference signal.

Measurement engine 630 is configured to generate one or more measurements 650 based on the outputs of the processing pipelines 620. For instance, measurement engine 630 may include one or more processors configured to calculate a TOA or an RSTD value based on a time of receipt (e.g., according to a local clock of the UE). For example, to measure TOA, the measurement engine 630 may reconstruct a PRS signal sequence based on FFT results obtained for a PRS occasion, where the PRS occasion encompasses multiple subframes, multiple slots per subframe, and multiple symbols per slot. After reconstructing the PRS signal sequence, the measurement engine 630 may perform a correlation operation by multiplying the reconstructed PRS signal sequence with the complex conjugate of a reference PRS signal sequence associated with the cell ID of the cell from which the PRS signal was transmitted, thereby producing a sequence of correlation values. TOA can be determined based on the timing of a peak in the correlation values. RSTD can be calculated as the difference between the TOA of a PRS signal from a reference cell/base station and the TOA of a PRS signal from a neighbor cell/base station. The measurement engine 630 can perform similar measurements for other types of reference signals. The measurement(s) 650 can include measurements from multiple reference signals of the same type (e.g., a set of measurements 650 derived from two or more PRS signals). Further, in some embodiments, the measurement engine 630 may be configured to generate a set of measurements 650 from multiple types of reference signals (e.g., PRS in combination TRS or DMRS) for use with determining the position of UE 600. In some embodiments, one or more measurements may be performed locally within the Rx chains 610 (e.g., positioning measurements that involve only one reference signal) and sent from the Rx chains to the measurement engine 630.

Measurement engine 630 and/or Rx chains 610 may also perform other types of positioning measurements, such as the signal power and/or signal quality measurements described above in connection with FIG. 3. In some embodiments, the measurement engine 630 and/or Rx chains 610 may be configured to perform any combination (e.g., two or more) of the following: a TOA measurement, an RSTD measurement, an RSRP measurement, a quality metric (e.g., Signal to Interference and Noise Ratio (SINR) or RSSI), a Receive-Transmit (Rx-Tx) measurement (e.g., the time difference between when a PRS is transmitted and when the PRS is received), an angle measurement (e.g., AOA or AOD), a velocity measurement, a Doppler measurement, and the like. When performing UE-based positioning, the measurements 650 generated by the measurement engine 630 can be input to a position engine (not depicted) local to the UE. The position engine may include hardware and/or software configured to calculate the location of the UE according to one or more position methods (e.g., DL-TDOA, DL-AoD, Multi-RTT, etc.). The position engine can be implemented using one or more processors which may, in some implementations, be shared with the measurement engine 630 and/or or components of the UE. When performing network-based positioning, the UE may transmit the measurements 650 generated by the measurement engine 630 to a location server, such as location server 360 in FIG. 3 or LMF 220 in FIG. 2. Accordingly, the position engine may be local to the location server instead of the UE.

Depending on environmental factors such as movement of the UE 600, movement of a base station (in case of a mobile base station), weather, physical obstacles, and the like, there may be times when UE 600 cannot use all of its Rx chains 610 for performing measurements based on received reference signals. Referring back to the example of FIG. 3, assume that each antenna 612 on the UE 600 in FIG. 6 receives a separate PRS corresponding to one of the wireless positioning signals 350-1, 350-2, or 350-3. At time T1, the UE may be located nearest to base station 320-1 and outdoors in a relatively unobstructed environment, so each of the wireless positioning signals 350 is received with little to no attenuation. At time T2, the UE may have moved indoors so that wireless positioning signal 350-2 or wireless positioning signal 350-3 is degraded to the point of deep fading, but wireless positioning signal 350-1 is only slightly attenuated. In this situation, at time T2, the UE may not be able to successfully decode using the Rx chain that receives the deeply faded signal. Consequently, the measurement engine 630 may generate fewer measurements than at time T1, which reduces the accuracy of the location determination at time T2 relative to time T1. Accordingly, which Rx chains can be used to perform a measurement can vary from one PRS occasion to the next.

In LTE, a UE is typically configured to use two Rx chains for performing measurements. However, LTE accuracy requirements for the location of a UE are lower compared to 5G NR (on the order of several meters for 5G versus hundreds of meters for LTE). The increased accuracy requirement for 5G means that in some cases, two Rx chains may not be enough for obtaining a sufficiently accurate estimate of the UE's location. This may be true even if signals from both Rx chains are not in deep fading. Accordingly, it may be useful for the UE or other device that calculates the UE's location to know how many Rx chains were used to determine positioning measurements for any given location calculation, since the number of Rx chains used is indicative of the accuracy of the resulting position fix.

The hardware capabilities of a UE are sometimes reported to a location server and/or other entity such as a base station, and such reporting may include the total number of Rx antennas available to the UE. For instance, 3GPP TS (Technical Standard) 37.355 specifies an optional information element "numberOfRXantennas-r14" that can be used to report the total number of Rx antennas which, in the case of a one-to-one association between antennas and Rx chains as in the example of FIG. 6, is the same as the total number of Rx chains. In use, this optional information element is sent at the beginning of a positioning session to inform the entity receiving the report about the capabilities of the UE. The reported capabilities may include, for example, a list of position methods supported by the UE. However, the number of Rx chains used for performing a positioning measurement is not traditionally reported. Thus, in a legacy implementation, a UE may initially report that it has four Rx antennas (implying a total of four Rx chains), but the UE may only be configured to use two of the four Rx chains for obtaining positioning measurements, and in some instances the PRS signal received using one of the two Rx chains may be in deep fading so measurements are obtained from only one of the two RX chains.

Accordingly, in some aspects, a UE may be configured to determine that a reference signal processed through an Rx chain is in deep fading and, based on this determination, prevent the reference signal from being used for a position measurement or exclude a positioning measurement resulting from the reference signal from being used for calculating position. For instance, the UE may decide not to forward measurements derived from the reference signal to a location server. The determination that the reference signal is in deep fading may involve determining that an SNR or other indicator of the quality of the reference signal is below a threshold. Further, the UE may be configured to report the number of Rx chains that were used to determine one or more positioning measurements (e.g., the number of Rx chains used to obtain TOA and RSTD measurements). This reporting is depicted in FIG. 6 as an additional output 660 from the measurement engine 630. The UE may send (e.g., using a wireless transmitter) this report to the location server (e.g., LMF), a base station (e.g., gnB), or some other entity that the UE is in communication with. In some embodiments, this reporting may be performed for each PRS occasion or positioning occasion in order to indicate how many Rx chains were used for determining positioning measurements during the PRS/positioning occasion.

The number of Rx chains used can be reported on a per-measurement basis and/or for a set of measurements (the set comprising one or more types of positioning measurements). For instance, a report can include information indicating a total number of Rx chains used for a given measurement or across multiple measurements, an average number of Rx chains used across measurements, the minimum (least number of) Rx chains used for any individual measurement among multiple measurements, and so on. As an example, the UE may report a single number (total, minimum, average, etc.) associated with twenty RSTD or Rx-Tx measurements. Alternatively or additionally, the UE may report a separate number for each individual measurement of the twenty measurements. Further, in some embodiments, a report may include a qualitative indication of how many Rx chains were used. For example, instead of a single numerical value, the UE may indicate that the number of Rx chains used falls within a particular range (e.g., 0 to 4 Rx chains, 5 to 10 Rx chains, etc.). As another example, the UE may indicate whether the number of Rx chains used across different measurements was the same or not. Thus, any information relating to how many Rx chains were used to determine one or more positioning measurements can be reported.

Knowledge about the number of Rx chains used to determine positioning measurements can be applied in various ways. As indicated above, the number of Rx chains used is indicative of the accuracy of the resulting position fix (assuming enough positioning measurements for obtaining a position fix were obtained). Thus, in some aspects, a location server or other entity calculating the location of a UE (in some instances, the UE itself) may be configured to calculate, based on the number of Rx chains that were used to determine positioning measurements, a Dilution of Precision (DOP) value or other metric indicative of the accuracy of the resulting position fix or indicative of the uncertainty of error in the measurements. The DOP value or other metric may be communicated to the UE along with the resulting position fix to enable the UE to respond accordingly. For instance, the UE may determine based on the DOP value that the position fix is sufficiently accurate. Alternatively, the UE may determine based on the DOP value that the position fix is not sufficiently accurate, in which case the UE may switch to a different position method (e.g., a position method involving another type of reference signal). Other actions can be taken by the UE and/or the entity receiving the report about the number of Rx chains used. For instance, the UE may request that a TRP, base station, or other reference signal source increase the number of reference signals transmitted in order to compensate for reference signals that are in deep fading.

Figure 7:
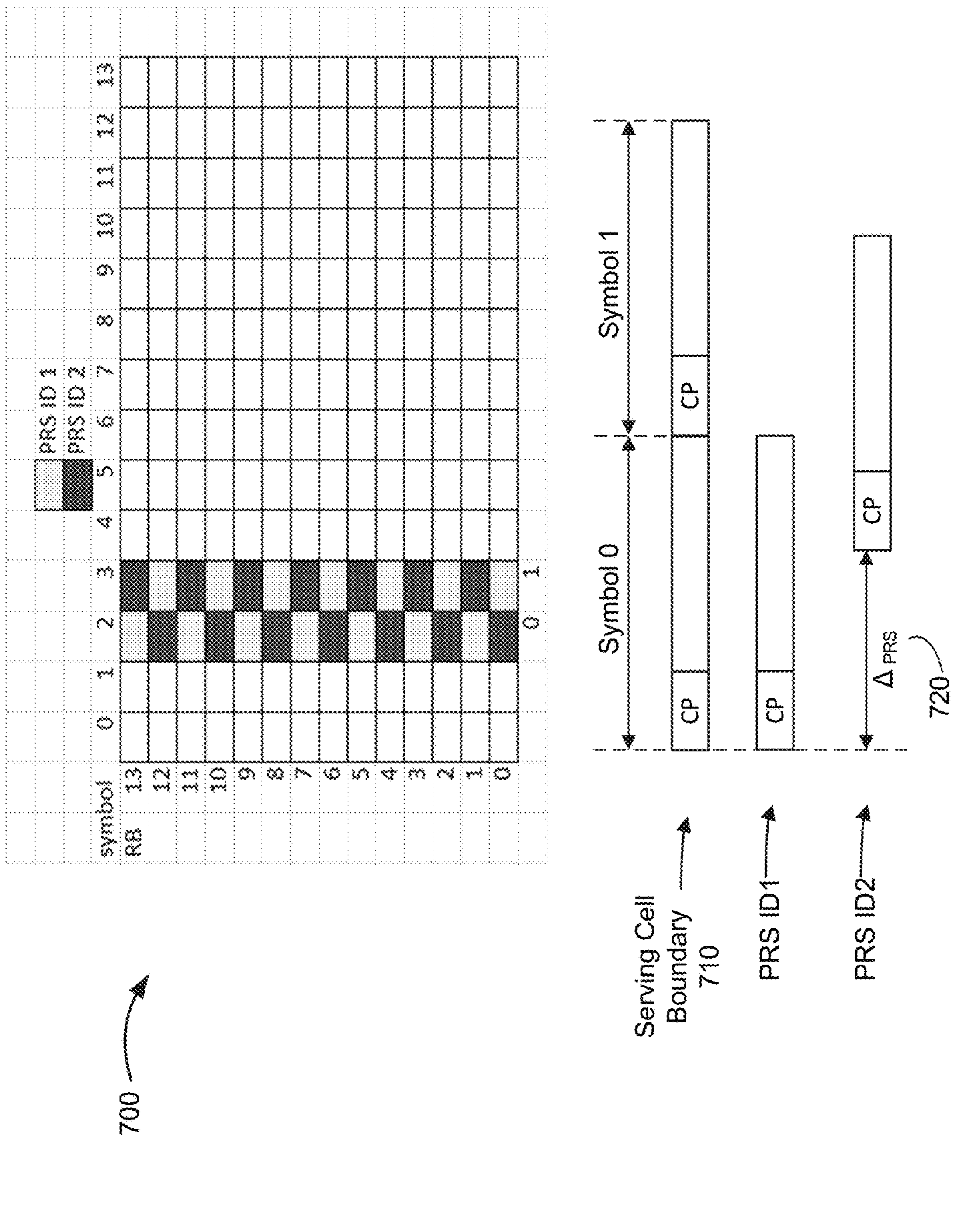
FIG. 7 illustrates an example of a resource block pattern for transmission of PRS signals.

FIG. 7 illustrates an example of a resource block (RB) pattern 700 for transmission of PRS signals. The RB pattern 700 may correspond to a subframe as discussed above in reference to FIG. 4. Not shown in FIG. 7 are resource elements for other types of signals. However, it is understood that the RBs in FIG. 7 can include resource elements (REs) that do not correspond to PRS signals. With reference to the frame structure in FIG. 4, a collection of REs that are used for transmission of PRS signals is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP or base station. In a given OFDM symbol in the time domain, a PRS resource may occupy consecutive RBs in the frequency domain.

The transmission of a PRS resource within a given RB has a particular comb size (also referred to as the "comb density"). A comb size "N" represents the subcarrier spacing (or frequency/tone spacing) within each symbol of a PRS resource configuration, where the configuration uses every Nth subcarrier of certain symbols of an RB. For example, for comb-4, REs corresponding to every fourth subcarrier (e.g., subcarriers 0, 4, 8) are used to transmit PRS of the PRS resource. Additionally, the transmission of a PRS resource within a given RB has a particular symbol length corresponding to the number of symbols spanned by the PRS resource. As shown in FIG. 7, two PRS signals are transmitted during symbol period 2 and symbol period 3 using a comb2-symbol2 option. The two PRS signals are labeled PRS ID 1 and PRS ID 2 and are referred to below by their respective PRS IDs.

FIG. 7 also illustrates the timing of the two PRS signals relative to a serving cell boundary 710. The serving cell boundary 710 may correspond to a frame boundary and/or sub-frame boundary associated with signals transmitted from a serving cell. For instance, as shown in FIG. 7, serving cell boundary 710 can include symbol boundaries. As discussed above in reference to FIG. 5, a UE may determine the timing of PRS occasions of a reference cell (in the example of FIG. 7, the serving cell) and neighbor cells for OTDOA positioning based, for example, on the assumption that PRS occasions from different cells overlap. As further discussed above, a UE may receive assistance data comprising PRS configuration parameters which can include, for each cell, a PRS ID, a cell global ID, and a cell-specific subframe offset ($\Delta_{PRS}$) 515.

In practice, a UE may not receive PRS signals from different cells at the same time even though the PRS signals may be transmitted at substantially the same time. This may be a result of the cells being at different distances from the UE (hence the offset 515). For example, referring back to FIG. 3, UE 305 may receive a PRS signal (e.g., PRS ID 1 in FIG. 7) from base station 320-1 sooner than a PRS signal (e.g., PRS ID 2) from base station 320-2 because base station 320-1 is associated with the serving cell and therefore likely to be closer to the UE than a base station associated with a neighbor cell (offset of zero or close to zero). As shown in FIG. 7, PRS ID 1 is time-aligned with the serving cell boundary 710 such that the beginning and end of a symbol for PRS ID 1 aligns with symbol 0 of the serving cell boundary 710. In contrast, PRS ID 2 is not aligned with any symbol of the serving cell boundary 710 and is delayed relative to symbol 0 by an offset 720.

A UE receiving PRS ID 1 and PRS ID 2 may be configured to process signals (voice, data, PRS, etc.) according to the serving cell boundary 710, which may be provided to the UE through assistance data from a location server or, in some instances, directly from the serving cell. The timing with which signals are processed (e.g., decoded) by the UE may be dictated by the serving cell boundary 710 and, in this sense, the UE can be considered as being synchronized to the timing of the serving cell. Thus, the UE may expect that the symbols of PRS ID 1 and PRS ID 2 be aligned with the same symbol (e.g., symbol 0) of the serving cell boundary 710. However, as explained above, not all PRS signals may be aligned to a serving or reference cell boundary.

If the UE attempts to process PRS ID 1 and PRS ID 2 using the timing of the serving cell, there will be a reduction of SNR for PRS ID 2 in direct proportion to the amount of time in which PRS ID 2 is not aligned with a serving cell boundary. As a result, the UE may not be able to fully decode PRS ID 2. In turn, the SNR reduction will degrade measurement reporting performance and, consequently, the accuracy of the resulting position fix. In contrast, since PRS ID 1 is aligned with symbol 0, the SNR of PRS ID 1 is maximized, so measurements obtained using PRS ID 1 are unlikely to contribute to a less accurate position fix. Accordingly, it may be beneficial for the UE to process at least some PRS signals according to a different timing than that of its serving or reference cell.

According to one aspect, a UE may support one or more methods for configuring the timing with which PRS signals are processed by the UE so that the timing is not constrained according to the timing of a serving cell or reference cell. Such methods can be used as an alternative to the serving cell timing based PRS processing described above. As discussed below in connection with FIG. 9, in some embodiments, a UE may process multiple PRS signals using different sets of Rx chains, where the PRS signals are received concurrently (e.g., during PRS occasions that at least partially overlap). Before turning to the discussion of this processing method, an alternative method for processing PRS signals is described in connection with FIG. 8. Further, as explained below, the method depicted in FIG. 8 has drawbacks that make the processing method of FIG. 9 better suited in certain situations.

Figure 8:
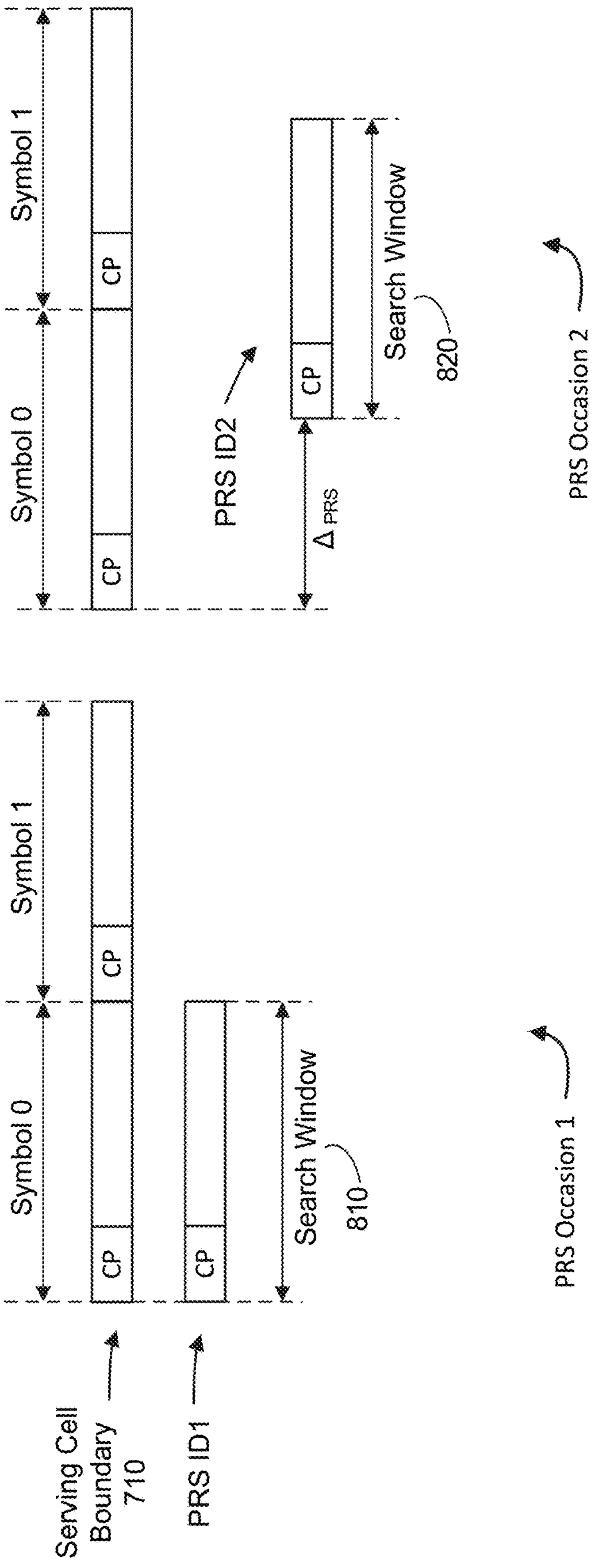
FIG. 8 illustrates a round robin method of PRS processing.

FIG. 8 illustrates a round robin method of PRS processing. According to the method of FIG. 8, PRS signals are processed sequentially, one at a time, and using the same Rx chains each time (e.g., a set of Rx chains associated with two or more antennas). In the simple case of two PRS signals (e.g., PRS ID 1 and PRS ID 2 as in FIG. 7), the PRS signals are processed in alternating fashion. For instance, as shown in FIG. 8, during PRS occasion 1, a UE may decode PRS ID 1 by aligning a search window (e.g., an FFT window) 810 to PRS ID 1. This alignment operates to maximize the energy of the received PRS signal. The UE may align the search window based on an expected delay of PRS ID1 (in this instance, the delay is zero) and/or an expected RSTD of PRS ID 1. The expected delay and/or the expected RSTD of a PRS signal may be provided to the UE using, for example, PRS configuration information supplied by a location server or other entity with knowledge of these expected values. Likewise, in PRS occasion 2, the UE may decode PRS ID2 by aligning a search window 820 to PRS ID 2, thereby maximizing the energy of PRS ID 2. The decoding in PRS occasion 1 can be performed using the same Rx chains as the decoding in PRS occasion 2. This processing can be repeated during subsequent occasions to decode both PRS signals in round robin fashion.

The method of FIG. 8 tends to maximize the SNR of received PRS signals for all PRS occasions, in particular, the SNR as measured after performing a correlation procedure against a reference PRS signal. However, since the processing of PRS signals is performed in round robin fashion, the total amount of time taken to obtain measurements from all of the PRS signals (e.g., both PRS ID 1 and PRS ID 2) is increased significantly compared to processing based on serving cell boundary. Thus, the method of FIG. 8 can potentially introduce a large amount of latency in the reporting of measurements depending on, for example, the total number of PRS signals to be measured. Consequently, the time needed to obtain a position fix may be increased. In extreme cases, the reporting of the measurements may be delayed to the point where the measurements become stale (e.g., because the UE has moved to a different location), so the resulting position fix will not be representative of the UE's current location.

Figure 9:
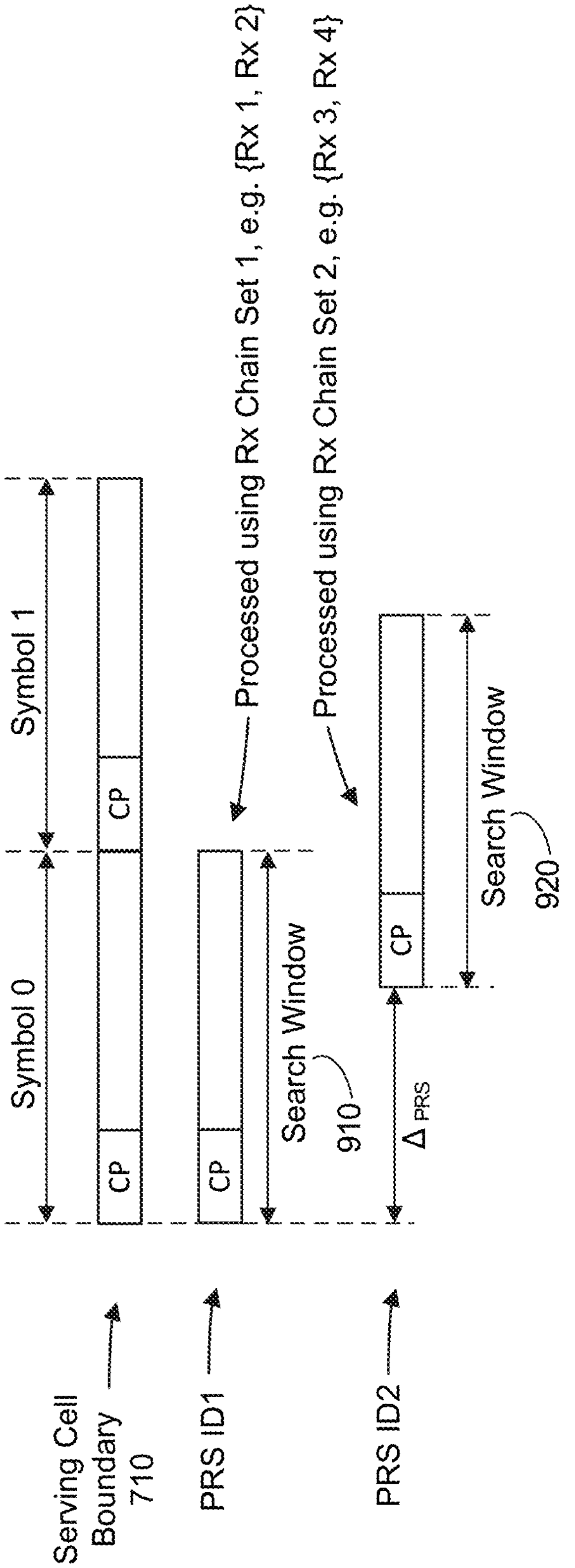
FIG. 9 illustrates a method of processing PRS signals according to an embodiment.

FIG. 9 illustrates a method of processing PRS signals according to an embodiment. The method of FIG. 9 involves distributing Rx chains into different sets, where each set of Rx chains is used for processing a separate PRS signal among multiple PRS signals that are received during PRS occasions that at least partially overlap in time. In this manner, multiple PRS signals can be processed concurrently to reduce processing time. Additionally, each PRS can be processed within a respective search window to enable maximum SNR for the PRS. For example, like the processing depicted in FIG. 8, a search window 910 can be applied to PRS ID1 and a separate search window 920 applied to PRS ID2. The search window 910 can be aligned to PRS ID1 to decode PRS ID1 during its respective occasion. Similarly, search window 920 can be aligned to decode PRS ID2 during its respective occasion. As described above with respect to FIG. 8, alignment can be performed based on expected delay (e.g., based on expected RSTD).

In contrast to the robin-robin method of FIG. 8, where the same set of Rx chains is used on different PRS occasions to process PRS signals one at a time, the method of FIG. 9 allocates different sets of Rx chains to each PRS signal to be processed. The total number of PRS signals that can be processed concurrently depends on how many Rx chains are available on the UE. As mentioned earlier, UEs are sometimes equipped with more UEs than necessary for PRS processing in accordance with conventional methods (e.g., a UE may have four or more Rx chains). Accordingly, as shown in FIG. 9, PRS ID1 can be processed using a first set of Rx chains (Rx chain set 1) comprising receive chains Rx 1 and Rx 2, while PRS ID2 can be processed using a second set of Rx chains (Rx chain set 2) comprising receive chains Rx 3 and Rx 4. For example, Rx 1 and Rx 2 may each be configured to process a respective Rx signal corresponding to PRS ID1 as received by a corresponding antenna element. Similarly, Rx 3 and Rx 4 may each be configured to process a respective Rx signal corresponding to PRS ID2 as received by a corresponding antenna element. In one embodiment, each set of Rx chains includes at least two Rx chains. However, in some instances, such as when PRS signals are transmitted using a Narrowband Internet-of-Things (NB-IoT) protocol, a set consisting of a single Rx chain may be used for PRS processing. Further, as discussed above, an Rx chain can be configured to process a combined Rx signal corresponding to a PRS received by a group of antenna elements. Therefore, Rx chain set 1 could comprise an Rx chain associated with antennas that form a first panel. Similarly, Rx chain set 2 could comprise an Rx chain associated with antennas that form a second panel separate from the first panel. Additionally, the total number of Rx chains in a set does not have to be the same across all sets, i.e., some sets may have more Rx chains than other sets.

The way in which the Rx chains are assigned to different sets can vary depending on implementation. In some embodiments, the Rx chains are pre-assigned. For example, a UE configured for concurrent processing of three PRS signals may be configured to use a first pair of Rx chains for processing a first PRS, a second pair of Rx chains for processing a second PRS, and a third pair of Rx chains for processing a third PRS, where the members of each pair of Rx chains is fixed. In another embodiment, each set of Rx chains is formed dynamically by selecting from a pool of available Rx chains. Rx chains can be assigned based on the spatial location of their Rx antennas, e.g., to minimize interference from PRS signals received by neighboring Rx antennas of other Rx chains. In the example of FIG. 9, the Rx chains are numbered according to the relative position of their corresponding antennas in an antenna array, e.g., the antenna of Rx 1 is adjacent to the antenna of Rx 2, the antenna of Rx 2 is adjacent to the antenna of Rx 3, and so on. Thus, as shown in FIG. 9, each set of Rx chains may be associated with a consecutive group of antennas. However, this need not always be the case. Additionally, a greater number of Rx chains can be assigned to a set when the PRS to be processed using the set is weak, e.g., as indicated by measured SNR being below a threshold. Other ways to assign Rx chains to different sets are possible.

The same set of Rx chains can be used to process every occasion of the same PRS, at least until enough measurements are obtained for performing a location estimate or other PRS-based calculation. For example, Rx chain set 1 can be configured to process Rx signals corresponding to each occasion of PRS ID1. Similarly, Rx chain set 2 can be configured to process Rx signals corresponding to each occasion of PRS ID2. Thus, each set of Rx chains can be dedicated to the processing of a unique PRS. This would ensure that different occasions of the same PRS are processed in a consistent manner, since different Rx chains could have different processing delays or other characteristics that may influence the resulting measurements. This would also facilitate measurements that are performed across multiple occasions of the same PRS.

Additionally, another benefit of using the same set of Rx chains to process every occasion of the same PRS is that each PRS can be tracked independently using a respective set of Rx chains, by maintaining a separate search window (e.g., an FFT window) for the PRS. For example, by allocating a first set of Rx chains to a first PRS and allocating a second set of Rx chains to a second PRS having a similar center channel frequency as the first PRS (e.g., frequencies with 50 Mhz or less of each other), the first PRS and the second PRS can be more accurately tracked compared to using the same Rx chains for both the first PRS and the second PRS. Although each set of Rx chains can maintain its own search window, different sets of Rx chains may, in some instances, be tuned to the same center channel frequency. Rx chains can be tuned to the same center frequency to configure the Rx chains for processing Rx signals corresponding to the same PRS. Rx chains can be tuned to different center frequencies to configure different Rx chains for processing Rx signals corresponding to different PRSs. Tuning to the same center frequency can also be used when multiple TRPs or PRS sources are configured to provide PRS resources that collectively form a positioning frequency layer (PFL). A TRP or PRS source can provide PRS resources for multiple PFLs and can therefore transmit using different center frequencies, but PRS resources within the same PFL are generally transmitted using the same center frequency.

In order to ensure that different occasions of the same PRS signal are processed by the same set of Rx chains, each set of Rx chains can be allocated to a different PRS based on the apparent distance of the source of the PRS (e.g., a TRP or base station). For instance, the actual delay $\Delta_{PRS}$ can be measured for each occasion, and signals whose measured delays are within a certain range of each other and/or within a certain range of an expected delay specified for a particular PRS (e.g., an expected RSTD) can be processed using the same set of Rx chains.

It should be noted that in the method of FIG. 9, processing of other types of signals that may depend on synchronization with a serving or reference cell boundary can still proceed as normal, assuming enough Rx chains are available for such additional processing. Thus, PRS signals can be processed in an expedient manner while maximizing the SNR of each PRS signal, and without adversely impacting the throughput of the decoding of non-PRS signals.

Figure 10:
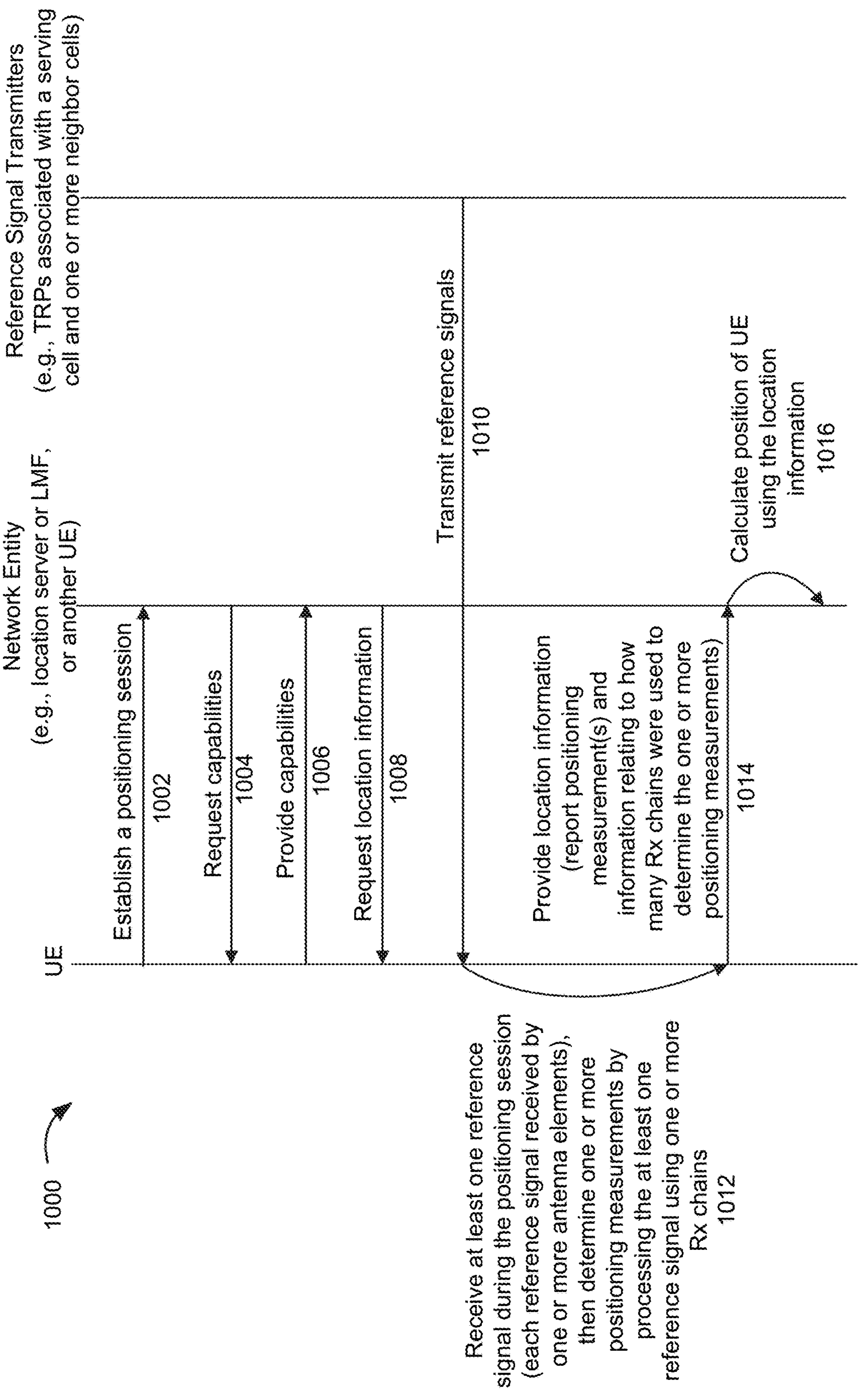
FIG. 10 is a flow diagram of a method for reporting positioning measurements, according to an embodiment.
Figure 13:
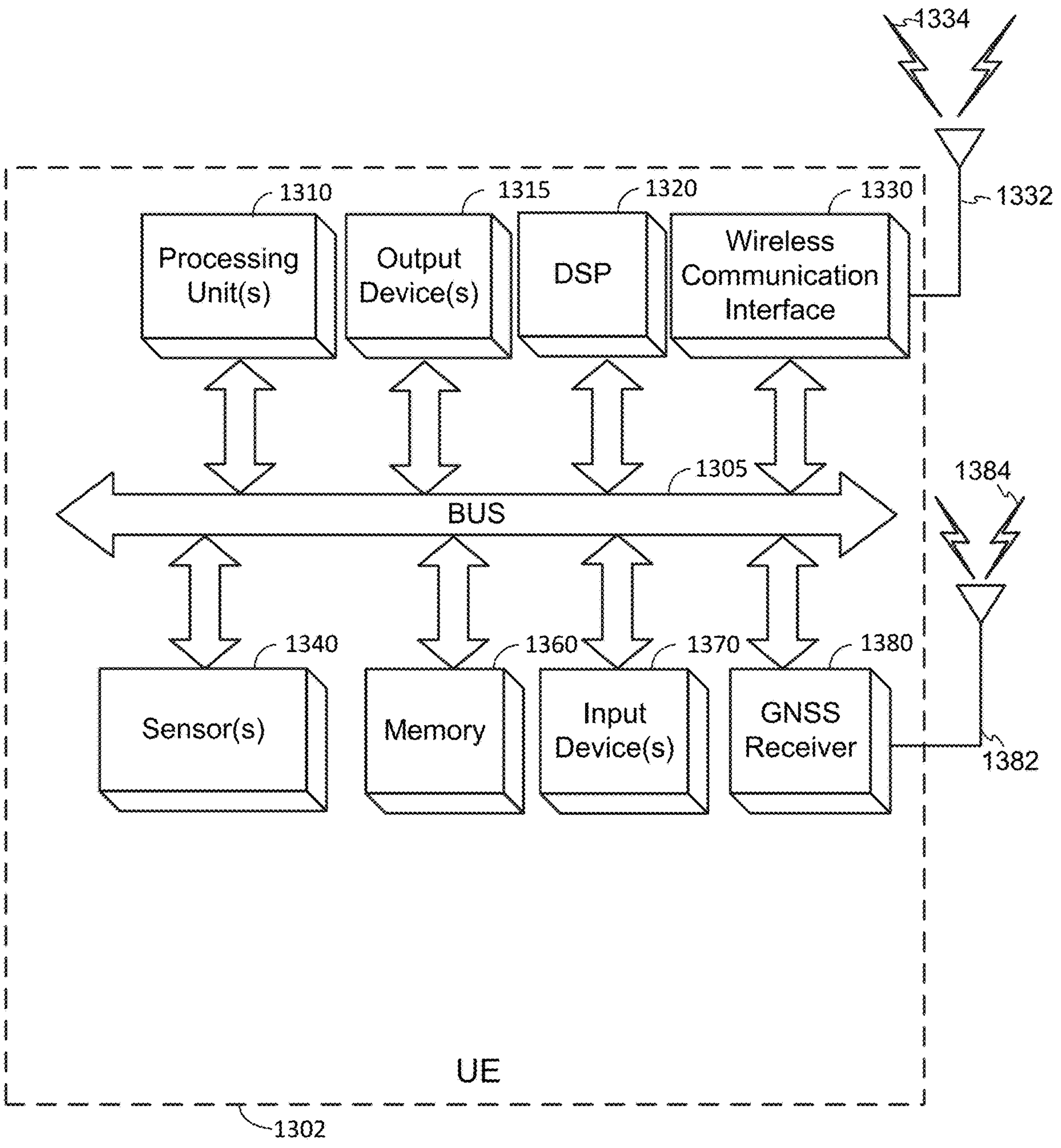
FIG. 13 is illustrates an embodiment of a UE, which can be utilized in embodiments described herein.

FIG. 10 is a flow diagram of a method 1000 for reporting positioning measurements, according to an embodiment. Means for performing the functionality illustrated in FIG. 10 may be performed by hardware and/or software components of a UE (e.g., one or more processors including a processor of at least one Rx chain in the UE, a processor implementing a measurement engine, or both). In addition to the UE, other functionality illustrated in FIG. 10 may be performed by a network entity (e.g., a location server or LMF, or another UE) that is remotely located from the UE, and one or more reference signal transmitters (e.g., TRPs associated with a serving cell and one or more neighbor cells). Example components of a UE are illustrated in FIG. 13, which is described in more detail below.

At 1002, the UE establishes a positioning session with the network entity, that is, a session for the purpose of estimating the position/location of the UE based on positioning measurements derived using reference signals. The positioning session can be initiated by the UE or the network entity. For instance, as part of establishing the positioning session in 1002, the UE may send a message indicating that the UE wants to begin a positioning session (e.g., an LPP session). In general, communications during a communication session such as a positioning session may involve one or more transactions, each transaction including a message sent from a first endpoint (e.g., the UE) to a second endpoint (e.g., the network entity) and an acknowledgement sent from the second endpoint back to the first endpoint after the second endpoint has successfully decoded the message from the first endpoint. If the second endpoint cannot decode the message, the second endpoint may not send an acknowledgement, which may in turn cause the first endpoint to retransmit the message. For simplicity, acknowledgments and retransmission are omitted from FIG. 10.

At 1004, the network entity may send a Request Capabilities message to the UE. The Request Capabilities message is a message requesting the UE to enumerate its functionality. Such functionality may include hardware resources, software resources, supported position methods, and the like.

At 1006, the UE provides its capabilities to the network entity. For instance, the UE may send a Provide Capabilities message (e.g., an OTDOA Provide Capabilities message) including one or more information elements that enumerate the UE's capabilities such as, for example, the total number of Rx antennas/chains that the UE has available. However, as discussed above, the total number of Rx chains available may be different than the total number of Rx chains actually used to perform a positioning measurement, e.g., because the UE is configured to use less than the total number of available Rx chains and/or because Rx chains allocated for processing a particular reference signal cannot be used due to deep fading of the reference signal.

At 1008, the network entity requests location information. The requested location information may include positioning measurements that the UE is capable of providing, as indicated by the capabilities enumerated in the Provide Capabilities message in 1006.

At 1010, reference signals (e.g., PRS signals) that are usable for determining positioning measurements from which the position of the UE can be calculated according to one or more position methods are transmitted from multiple sources. Such reference signals can be transmitted, for example, from a TRP associated with a serving cell and TRPs associated with neighbor cells, as depicted in FIG. 3. The reference signals may be broadcast concurrently, and the amount of time it takes for the UE to receive a reference signal after the reference signal has been transmitted is indicative of the distance between the UE and the transmitter of the reference signal. The reference signals transmitted in 1010 can be repeatedly transmitted on a periodic basis, e.g., each reference signal can be repeated at a fixed interval.

At 1012, the UE receives, during the positioning session, at least one of the reference signals transmitted in 1010. The UE then determines one or more positioning measurements) by processing the at least one reference signal using one or more Rx chains. The one or more positioning measurements can, for example, include a TOA measurement, an RSTD measurement, an RSRP measurement, a quality metric (e.g., SINR or RSSI), an Rx-Tx measurement, an angle measurement, a velocity measurement, a Doppler measurement, or any combination thereof. In general, positioning measurements derived from multiple reference signals are used together to calculate a position (e.g., through trilateration). Thus, whether or not a position can be calculated depends on how many positioning measurements are determined. As indicated above, an Rx signal or combined Rx signal corresponding to a particular reference signal can be processed using a separate set of Rx chains. Thus, if multiple reference signals are received in 1012, each of the reference signals may be processed using a different set of Rx chains. In some instances, the processing of the at least one reference signal in 1012 may involve the use of assistance data. Accordingly, at some point in the positioning session prior to 1012, the UE may send a Request Assistance Data message to the network entity, which may respond with a Provide Assistance Data message. The contents of the Provide Assistance Data message may include, for example, one or more expected RSTD values.

At 1014, the UE provides location information to the network entity. The location information provided by the UE can be provided in the form of a Location Information message containing a report that includes the one or more positioning measurements determined in 1012. The report can also include information relating to how many Rx chains were used to determine the one or more positioning measurements. This information can be used to determine the level of confidence in the correctness of the positioning measurement(s). The greater the number of Rx chains used, the higher the confidence, and thus the greater the accuracy of a resulting position calculated using the positioning measurement(s). Examples of information that can be included in the report include, but are not limited to, a total number of Rx chains used to determine multiple positioning measurements, a total number of Rx chains used to determine an individual positioning measurement among multiple positioning measurements, an average number of Rx chains used across multiple positioning measurements, and/or a lowest number of Rx chains used to determine any individual positioning measurement among multiple positioning measurements. Further, in some instances the report may identify which specific Rx chains and/or associated antenna elements were used. Thus, the report may, instead of or in addition to the types of information mentioned above, include information that identifies which Rx chains among the Rx chains that the UE is equipped with were used to determine a positioning measurement of a first PRS (each Rx chain may be assigned a number or other unique identifier), which antenna elements supplied an Rx signal or combined Rx signal that was processed to determine a positioning measurement of the first PRS, and/or other information indicative of the actual usage of the Rx chains and their associated components in connection with determining the positioning measurement(s).

At 1016, the network entity calculates the position of the UE using the location information provided in 1014, assuming a sufficient number of positioning measurements were provided as part of the location information. The calculation by the network entity can take into consideration the information relating to how many Rx chains were used, as reported in 1014. For example, the network entity may determine a geometric dilution of precision (GDOP) metric or other metric indicative of the degree of uncertainty in the calculated position. Alternatively, in some instances the position and/or the uncertainty metric may be calculated by the UE itself.

After calculating the position of the UE in 1016, the network entity may communicate the calculated position back to the UE, possibly together with the GDOP or other metric indicative of the degree of uncertainty in the calculated position. Further, the UE and/or the network entity can take action based on the calculated position, the GDOP/other metric, and/or the information relating to how many Rx chains were used. For instance, the UE may, in response to the GDOP being below a threshold, switch to a different position method, reconfigure itself to process additional reference signals (e.g., by allocating an additional Rx chain for determining one or more positioning measurements in connection with another instance of receiving the at least one reference signal), or request additional reference signals from the reference signal transmitters.

FIG. 11 is a flow diagram of a method 1100 for performing positioning measurements using multiple Rx chains, according to an embodiment. Means for performing the functionality illustrated in FIG. 11 may be performed by hardware and/or software components of a UE (e.g., processors of at least two Rx chains in the UE, a processor implementing a measurement engine, or both). Although described with respect to PRS signals, the method of FIG. 11 can be used for generating positioning measurements from other types of reference signals that overlap in time.

At 1102, a first PRS is received from a first transmitter device during a first PRS occasion and using a first set of antenna elements of a UE. The first set of antennas elements generally includes at least two Rx antennas, but in some instances may include as few as one Rx antenna. The first transmitter device can be any PRS source (e.g., a base station or TRP) within range of the first set of antenna elements. For instance, the first PRS may be a signal that is periodically broadcast by a TRP associated with a current serving cell of the UE.

At 1104, a second PRS is received from a second transmitter device during a second PRS occasion and using a second set of antenna elements of the UE. The first set of antenna elements is separate from the second set of antenna elements. Each antenna element in both the first set of antenna elements and the second set of antenna elements is associated with an Rx chain. The Rx chain that is associated with any particular antenna element is configured to process an Rx signal corresponding to a PRS received by a single antenna element (e.g., as shown in the example of FIG. 6) or configured to process a combined Rx signal corresponding to a PRS received by a group of antenna elements (e.g., when the first set of antenna elements or the second set of antenna elements forms a receive panel).

The source of the first PRS in 1102 and the source of the second PRS in 1104 can be two transmitter devices in different locations. For example, if the source of the first PRS is as TRP associated with a serving cell, the source of the second TRP may be a TRP associated with a neighbor cell. Both PRS sources may be configured to transmit their respective PRS at around the same time, i.e., substantially simultaneously. Because the PRS sources are in different locations, the first PRS and the second PRS may arrive at the UE at different times. However, due to the first PRS occasion at least partially overlapping with the second PRS occasion, the first PRS and the second PRS may be received concurrently.

At 1106, the UE may process the first PRS using one or more Rx chains associated with the first set of antenna elements. In particular, Rx signals or a combined Rx signal corresponding to the first PRS can be processed using the one or more Rx chains associated with the first set of antenna elements (e.g., Rx 1 and Rx 2 in the example of FIG. 9). Similarly, the UE may, at 1106, process Rx signals or a combined Rx signal corresponding to the second PRS, using one or more Rx chains associated with the second set of antenna elements (e.g., Rx 3 and Rx 4). The processing in 1106 may involve aligning a separate search window to each PRS. As discussed above, alignment can be based on the expected delay (e.g., expected RSTD) of each PRS. In some embodiments, the search windows are FFT windows that determine which time samples of the PRS signals are subjected to Fourier transforms. When the first PRS and the second PRS are received concurrently and processed using different sets of Rx chains, the processing of the first PRS and the processing of the second PRS can occur in parallel. However, the Rx chains(s) that process the first PRS may output results at a different time than the Rx chains(s) that process the second PRS.

At 1108, positioning measurements are determined using: (i) results of the processing of the Rx signals or combined Rx signal corresponding to the first PRS and (ii) results of the processing of the Rx signals or combined Rx signal corresponding to the second PRS. The positioning measurements determined in 1108 can include any of the types of positioning measurements described above, such as a TOA measurement, an RSTD measurement, an RSRP measurement, a quality metric (e.g., SINR or RSSI), an Rx-Tx measurement, an angle measurement, a velocity measurement, a Doppler measurement, or any combination thereof. For example, the positioning measurements determined in 1108 can include, a TOA measurement and an RSTD measurement for each of the first PRS and the second PRS. Once the positioning measurements are determined, the positioning measurements can be reported to a network entity (e.g., a location server) for calculation of the position of the UE by the network entity. Alternatively, the positioning measurements can be processed locally to calculate the UE's position using one or more processing units of the UE. Thus, the method of FIG. 11 is applicable to UE-based position methods as well as UE-assisted position methods.

Figure 12:
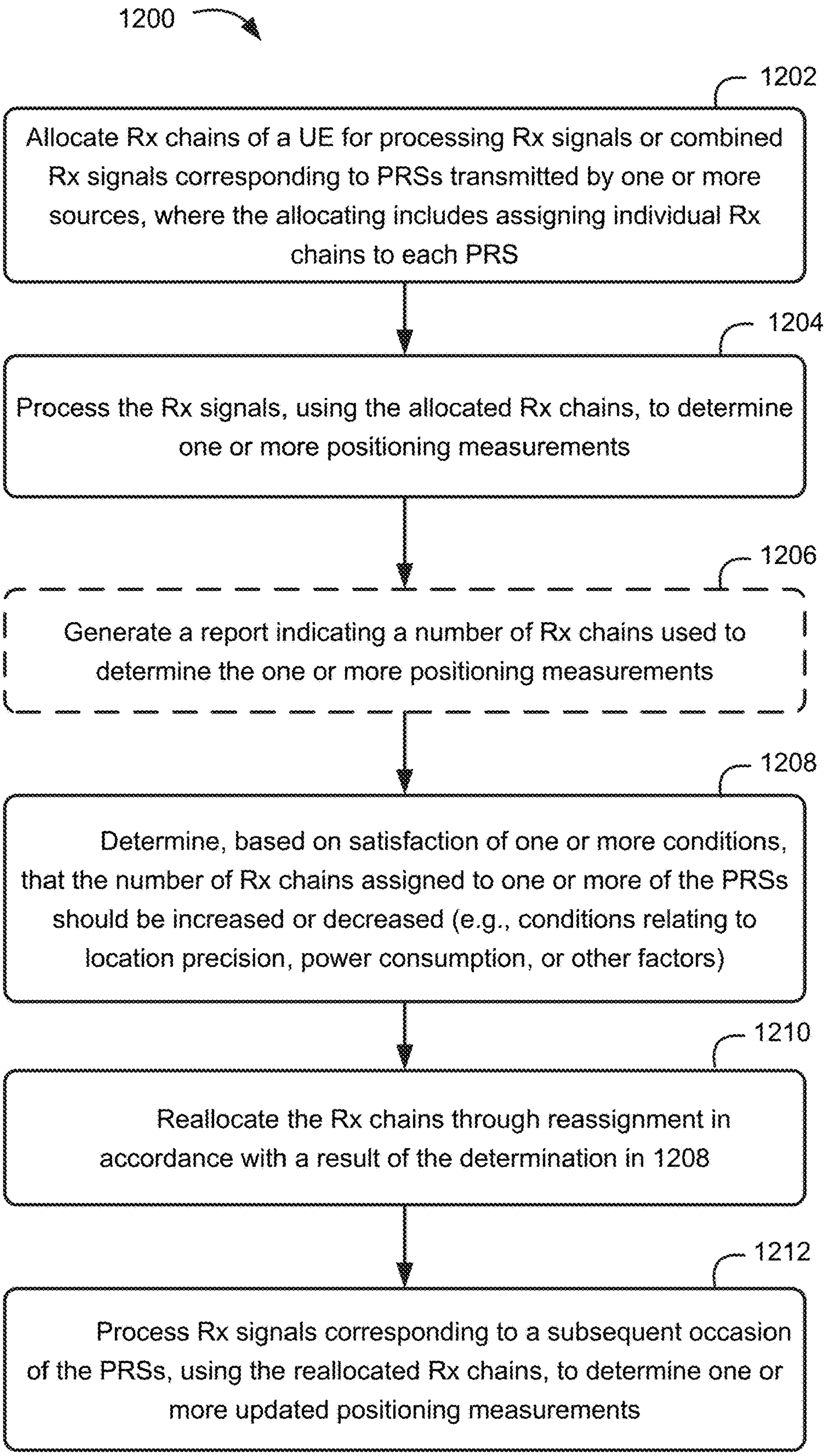
FIG. 12 is a flow diagram of a method for allocating Rx chains, according to an embodiment.

FIG. 12 is a flow diagram of a method 1200 for allocating Rx chains, according to an embodiment. Means for performing the functionality illustrated in FIG. 12 may be performed by hardware and/or software components of a UE (e.g., processors of at least two Rx chains in the UE, a processor implementing a measurement engine, or both). Although described with respect to PRSs, the method of FIG. 12 can be used for generating positioning measurements from other types of reference signals that overlap in time. The method of FIG. 12 can be executed to allocate Rx chains for use in performing any of the Rx chain-related operations described herein, including the operations described above with reference to FIGS. 10 and 11.

At 1202, Rx chains of a UE are allocated for processing Rx signals or combined Rx signals corresponding to PRSs transmitted by one or more sources (e.g., a first PRS and a second PRS). In typical usage, at least two Rx chains are initially allocated. However, depending on the configuration of the UE, only one Rx chain may be allocated initially. For example, some UEs may be configured to perform processing using a single Rx chain for power savings or reduction of computational resources during certain operating conditions (e.g., low power or sleep mode). Further, the number of Rx chains allocated in 1202 may depend on usage scenario, and the number can vary among different types of UEs. For example, an IoT device may be configured to use fewer Rx chains than smartphone or car navigation system.

Each Rx chain allocated in 1202 may be configured to process an Rx signal or combined Rx signal corresponding to a PRS. As discussed above, antennas can be arranged to form a receive panel so that Rx signals from multiple antennas in the panel are combined for processing by an Rx chain. Alternatively, an Rx chain may be configured to process an Rx signal from a single antenna. Thus, each allocated Rx chain is associated with one or more antennas. As part of the allocating in 1202, individual Rx chains may be assigned to each PRS. For example, if the UE is equipped with eight Rx chains and there are two PRSs to be processed, the UE may select two Rx chains for use in processing Rx signals corresponding to the first PRS and another two Rx chains for use in processing Rx signals corresponding to the second PRS. In some instances, the UE may be configured to assign the same set of Rx chains for processing different PRSs, so that there is partial or complete overlap between the Rx chains allocated for use in processing Rx signals of the first PRS and the Rx chains allocated for use in processing Rx signals of the second PRS.

At 1204, Rx signals are processed, using the Rx chains that were allocated in 1202, to determine one or more positioning measurements of each PRS. The processing may involve any of the various operations described earlier, including baseband conversion, analog-to-digital conversion, applying a Fourier Transform, and the like. In general, the same types of measurements are determined for each PRS (e.g., an RSTD or RSRP measurement for the first PRS and another RSTD or RSTP measurement for the second PRS). However, the UE may in some instances determine different types of measurements for different PRSs.

At 1206, the UE may optionally generate a report indicating a number of Rx chains used to determine the one or more positioning measurements in 1204. The reporting can be performed, for example, according to the method shown in FIG. 10.

At 1208, a determination is made, based on satisfaction or one or more conditions, that the number of Rx chains assigned to one or more of the PRSs should be adjusted (increased or decreased). The conditions may be conditions specified in a configuration of the UE, e.g., programmed into a memory of the UE or hardwired into a processing component such as the measurement engine 630 of FIG. 6. In some instances, the conditions may be provided to the UE through wireless communication, for example, from a network entity that received the report in 1206, or from some other entity configured to estimate the position of the UE using the measurements determined in 1204. Thus, the conditions can be either fixed or reconfigurable. The conditions can include performance related conditions, such as the precision of a position estimate obtained using the measurements determined in 1204. Conditions can also relate to the current operational status of the UE. For example, the UE may be configured to reduce the total number of Rx chains allocated when a battery level of the UE falls below a certain value. As another example, the UE may be configured to increase the total number of Rx chains allocated when greater positioning accuracy is required. For instance, the UE may determine that position accuracy would be improved by using Rx chains for the first PRS that are separate from those used for the second PRS, due to a center channel frequency of the first PRS being close or similar to (e.g., within a threshold frequency range of) a center channel frequency of the second PRS.

The determination in 1208 results in a decision to reallocate the Rx chains that the UE is equipped with. For example, if the same set of Rx chains were initially assigned to both the first PRS and the second PRS in 1202, one possible outcome of the determination in 1208 is that a separate set of Rx chains (e.g., two Rx chains that are not currently being used) should be assigned to the second PRS so that Rx signals corresponding to a subsequent occasion of the second PRS are processed using the separate set of Rx chains, while the initial set of Rx chains are used for processing Rx signals corresponding to a subsequent occasion of the first PRS. Thus, the UE may switch between using separate sets of Rx chains and using the same set of Rx chains for different PRSs. Alternatively, the UE can be configured to always use separate sets of Rx chains for different PRSs, but the number of Rx chains assigned to a given PRS may vary over the course of UE operation. For instance, the determination in 1208 may result in a decision to assign more Rx chains to the first PRS while keeping the number of Rx chains for the second PRS the same.

At 1210, the Rx chains of the UE are reallocated in accordance with the result of the determination in 1208. The reallocation in 1210 may involve changing which Rx chains are assigned to at least one of the PRSs. As part of reallocating the RX chains, the UE may configure or reconfigure Rx chains for use with a particular PRS. For example, the search window used by an Rx chain that is newly assigned to the first PRS may be updated to correspond to a window that is aligned with the next occasion of the first PRS. As another example, the UE may update a center channel frequency used by an Rx chain to match that of the PRS that the Rx chain has been assigned to.

At 1212, Rx signals corresponding to a subsequent occasion of the PRSs are processed using the reallocated Rx chains. Thus, the Rx chain(s) that are now assigned to the first PRS may process one or more Rx signals or combined Rx signals corresponding to a subsequent occasion of the first PRS. Similarly, the Rx chain(s) that are now assigned to the second PRS may process one or more Rx signals or combined Rx signals corresponding to a subsequent occasion of the second PRS, where the subsequent occasion of the second PRS at least partially overlaps with the subsequent occasion of the first PRS (e.g., the scenario depicted in FIG. 7). The resulting positioning measurements can then be used by the UE to estimate its own position or sent to another entity that estimates the UE's position based on the positioning measurements.

FIG. 13 illustrates an embodiment of a UE 1302, which can be utilized as described herein above. For example, the UE 1302 can perform one or more of the functions of the methods shown in FIG. 10 or FIG. 11. The UE 1302 may also implement one or more of the UEs described above (e.g., the UE 105 in FIG. 1, the UE 305 in FIG. 3, and/or the UE 600 in FIG. 6). It should be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be disposed at different physical locations. Furthermore, as previously noted, the functionality of the UEs discussed in the previously described embodiments may be executed by one or more of the hardware and/or software components illustrated in FIG. 13.

The UE 1302 is shown comprising hardware elements that can be electrically coupled via a bus 1305 (or may otherwise be in communication, as appropriate). The hardware elements may include a processing unit(s) 1310 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 13, some embodiments may have a separate DSP 1320, depending on desired functionality. Location determination and/or other determinations based on wireless communication may be provided in the processing unit(s) 1310 and/or wireless communication interface 1330 (discussed below). The UE 1302 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The UE 1302 may also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1302 to communicate with other devices as described in the embodiments above. The wireless communication interface 1330 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1302 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 4" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1302 can further include sensor(s) 1340. Sensors 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1302 may also include a Global Navigation Satellite System (GNSS) receiver 1380 capable of receiving signals 1384 from one or more GNSS satellites using an antenna 1382 (which could be the same as antenna 1332). Positioning based on GNSS signal measurement can be utilized to complement and/or incorporate the techniques described herein. The GNSS receiver 1380 can extract a position of the UE 1302, using conventional techniques, from GNSS satellites of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1380 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1380 is illustrated in FIG. 13 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1310, DSP 1320, and/or a processing unit within the wireless communication interface 1330 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1310 or DSP 1320.

The UE 1302 may further include and/or be in communication with a memory 1360. The memory 1360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the UE 1302 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the UE 1302 (and/or processing unit(s) 1310 or DSP 1320 within UE 1302). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of reporting resources used to determine positioning measurements, the method comprising performing the following by a user equipment (UE): determining one or more positioning measurements of a reference signal using one or more receive (Rx) chains, wherein each Rx chain processes an Rx signal corresponding to the reference signal received by a single antenna element or a combined Rx signal corresponding to the reference signal received by a group of antenna elements; and reporting, to a network entity, the one or more positioning measurements and information indicating a number of Rx chains used to determine the one or more positioning measurements.

Clause 2. The method of clause 1 wherein the one or more positioning measurements include a Time of Arrival (TOA) measurement, a Reference Signal Time Difference (RSTD) measurement, a Reference Signal Receive Power (RSRP) measurement, a Signal to Interference and Noise Ratio (SINR) measurement, a Received Signal Strength Indication (RSSI) measurement, a quality metric, a Receive-Transmit (Rx-Tx) measurement, an angle measurement, a velocity measurement, a Doppler measurement, or a combination thereof.

Clause 3. The method of clause 1 or 2, wherein the information indicating the number of Rx chains used to determine the one or more positioning measurements comprises an indication of at least one of: a total number of Rx chains used to determine multiple positioning measurements, a total number of Rx chains used to determine an individual positioning measurement among multiple positioning measurements, an average number of Rx chains used across multiple positioning measurements, or a lowest number of Rx chains used to determine any individual positioning measurement among multiple positioning measurements.

Clause 4. The method of any of clauses 1-3, wherein the information indicating the number of Rx chains used to determine the one or more positioning measurements identifies at least one of which Rx chains were used, or which antenna elements supplied an Rx signal or combined Rx signal that was processed, to determine the one or more positioning measurements.

Clause 5. The method of any of clauses 1-4, further comprising: determining a precision of the one or more positioning measurements based on the information indicating the number of Rx chains used to determine the one or more positioning measurements.

Clause 6. The method of clause 5, further comprising: requesting transmission of an additional reference signal based on the precision being below a threshold.

Clause 7. The method of clause 5 or 6, further comprising: calculating a position of the UE according to a first position method and using the one or more positioning measurements in combination with positioning measurements of additional reference signals; and switching to a second position method based on the precision being below a threshold.

Clause 8. The method of any of clauses 1-7, further comprising: allocating a first Rx chain for processing an Rx signal or combined Rx signal corresponding to the reference signal; and allocating a second Rx chain for processing an Rx signal or combined Rx signal corresponding to a second reference signal, wherein the second Rx chain is separate from the first Rx chain.

Clause 9. The method of clause 8, wherein the first Rx chain and the second Rx chain are allocated based on determining that the reference signal and the second reference signal have similar center channel frequencies.

Clause 10. The method of clause 8 or 9, further comprising: processing the Rx signal or combined Rx signal corresponding to the second reference signal using the second Rx chain; and determining one or more positioning measurements of the second reference signal using an output of the second Rx chain.

Clause 11. The method of any of clauses 1-10, further comprising: prior to receiving the reference signal, reporting a total number of Rx chains available to the UE, wherein a total number of Rx chains used to determine the one or more positioning measurements is less than the total number of Rx chains available to the UE.

Clause 12. The method of clause 11, wherein reporting the total number of Rx chains available to the UE comprises sending a Capabilities message to the network entity, and wherein reporting the information indicating the number of Rx chains used to determine the one or more positioning measurements comprises sending a Location Information message to the network entity.

Clause 13. The method of any of clauses 1-12, wherein determining the one or more positioning measurements comprises: converting an Rx signal corresponding to the reference signal received by a first antenna element into a baseband signal; and performing digital signal processing on the baseband signal using an Rx chain associated with the first antenna element, wherein the digital signal processing includes a Fast Fourier Transform.

Clause 14. The method of any of clauses 1-12, wherein determining the one or more positioning measurements comprises: converting a combined Rx signal corresponding to the reference signal received by a first group of antenna elements into a baseband signal; and performing digital signal processing on the baseband signal using an Rx chain associated with the first group of antenna elements, wherein the digital signal processing includes a Fast Fourier Transform.

Clause 15. A device comprising: a plurality of antenna elements; a plurality of receive (Rx) chains including one or more Rx chains that are each configured to process an Rx signal corresponding to a reference signal received by a single antenna element in the plurality of antenna elements or a combined Rx signal corresponding to the reference signal received by a group of antenna elements in the plurality of antenna elements; and one or more processors configured to determine one or more positioning measurements of the reference signal using output from the one or more Rx chains; and a wireless transmitter configured to report, to a network entity, the one or more positioning measurements and information indicating a number of Rx chains used to determine the one or more positioning measurements.

Clause 16. The device of clause 15, wherein the one or more positioning measurements include a Time of Arrival (TOA) measurement, a Reference Signal Time Difference (RSTD) measurement, a Reference Signal Receive Power (RSRP) measurement, a Signal to Interference and Noise Ratio (SINR) measurement, a Received Signal Strength Indication (RSSI) measurement, a quality metric, a Receive-Transmit (Rx-Tx) measurement, an angle measurement, a velocity measurement, a Doppler measurement, or a combination thereof.

Clause 17. The device of clause 15 or 16, wherein the information indicating the number of Rx chains used to determine the one or more positioning measurements comprises an indication of at least one of: a total number of Rx chains used to determine multiple positioning measurements, a total number of Rx chains used to determine an individual positioning measurement among multiple positioning measurements, an average number of Rx chains used across multiple positioning measurements, or a lowest number of Rx chains used to determine any individual positioning measurement among multiple positioning measurements.

Clause 18. The device of any of clauses 15-17, wherein the information indicating the number of Rx chains used to determine the one or more positioning measurements identifies at least one of which Rx chains were used, or which antenna elements supplied an Rx signal or combined Rx signal that was processed, to determine the one or more positioning measurements.

Clause 19. The device of any of clauses 15-18, wherein the one or more processors are configured to determine a precision of the one or more positioning measurements based on the information indicating the number of Rx chains used to determine the one or more positioning measurements.

Clause 20. The device of clause 19, wherein the device is configured to request transmission of an additional reference signal based on the precision being below a threshold.

Clause 21. The device of clause 19 or 20, wherein the one or more processors are configured to: calculate a position of the device according to a first position method and using the one or more positioning measurements in combination with positioning measurements of additional reference signals; and switch to a second position method based on the precision being below a threshold.

Clause 22. The device of any of clauses 15-21, wherein the one or more processors are configured to: allocate a first Rx chain for processing an Rx signal or combined Rx signal corresponding to the reference signal; and allocate a second Rx chain for processing an Rx signal or combined Rx signal corresponding to a second reference signal, wherein the second Rx chain is separate from the first Rx chain.

Clause 23. The device of clause 22, wherein the one or more processors are configured to allocate the first Rx chain and the second Rx chain based on determining that the reference signal and the second reference signal have similar center channel frequencies.

Clause 24. The device of clause 22 or 23, wherein the one or more processors are configured to: process the Rx signal or combined Rx signal corresponding to the second reference signal using the second Rx chain; and determine one or more positioning measurements of the second reference signal using an output of the second Rx chain.

Clause 25. The device of any of clauses 15-24, wherein the wireless transmitter is configured to, prior to the reference signal being received, report a total number of Rx chains available to the device, and wherein a total number of Rx chains used to determine the one or more positioning measurements is less than the total number of Rx chains available to the device.

Clause 26. The device of clause 25, wherein to report the total number of Rx chains available to the device, the wireless transmitter is configured to send a Capabilities message to the network entity, and wherein to report the information indicating the number of Rx chains used to determine the one or more positioning measurements, the wireless transmitter is configured to send a Location Information message to the network entity.

Clause 27. The device of any of clauses 15-26, wherein the plurality of Rx chains includes a first Rx chain configured to: convert an Rx signal corresponding to the reference signal received by a first antenna element into a baseband signal; and perform digital signal processing on the baseband signal, wherein the digital signal processing includes a Fast Fourier Transform.

Clause 28. The device of any of clauses 15-26, wherein the plurality of Rx chains includes a first Rx chain configured to: convert a combined Rx signal corresponding to the reference signal received by a first group of antenna elements into a baseband signal; and perform digital signal processing on the baseband signal, wherein the digital signal processing includes a Fast Fourier Transform.

Clause 29. A non-transitory computer readable medium containing instructions that, when executed by one or more processors, cause the one or more processors to: determine one or more positioning measurements of a reference signal using one or more receive (Rx) chains, wherein each Rx chain is configured to process an Rx signal corresponding to the reference signal received by a single antenna element or a combined Rx signal corresponding to the reference signal received by a group of antenna elements; and report, to a network entity, the one or more positioning measurements and information indicating a number of Rx chains used to determine the one or more positioning measurements.

Clause 30. A device comprising: a plurality of antenna elements; a plurality of receive (Rx) chains including one or more Rx chains that are each configured to process an Rx signal corresponding to a reference signal received by a single antenna element in the plurality of antenna elements or a combined Rx signal corresponding to the reference signal received by a group of antenna elements in the plurality of antenna elements; means for determining one or more positioning measurements of the reference signal using output from the one or more Rx chains; and means for reporting, to a network entity, the one or more positioning measurements and information indicating a number of Rx chains used to determine the one or more positioning measurements.

Clause 31. A method of determining positioning measurements using multiple receive (Rx) chains of a user equipment (UE), the method comprising performing the following by the UE: processing an Rx signal or combined Rx signal corresponding to a first Positioning Reference Signal (PRS), using an Rx chain associated with a first set of antenna elements; processing an Rx signal or combined Rx signal corresponding to a second PRS, using an Rx chain associated with a second set of antenna elements separate from the first set of antenna elements, wherein the Rx signal or combined Rx signal corresponding to the first PRS is generated during a first PRS occasion, and wherein the Rx signal or combined Rx signal corresponding to the second PRS is generated during a second PRS occasion that at least partially overlaps with the first PRS occasion; and determining the positioning measurements using: (i) results of the processing of the Rx signal or combined Rx signal corresponding to the first PRS and (ii) results of the processing of the Rx signal or combined Rx signal corresponding to the second PRS.

Clause 32. The method of clause 31, further comprising: receiving timing information associated with a serving or reference cell, the timing information indicating symbol boundaries; aligning a first Fast Fourier Transform (FFT) window to the first PRS occasion, using the Rx chain associated with the first set of antenna elements; aligning a second FFT window to the second PRS occasion, using the Rx chain associated with the second set of antenna elements, wherein the first FFT window and the second FFT window are aligned without regard to the symbol boundaries; and performing a first FFT using the first FFT window in parallel with performing a second FFT using the second FFT window.

Clause 33. The method of clause 31 or 32, wherein the first PRS occasion is aligned with a boundary of a first symbol, and wherein the second PRS occasion partially overlaps in time with the first PRS occasion and is not aligned with any symbol boundary.

Clause 34. The method of clause 32 or 33, wherein aligning the first FFT window to the first PRS occasion comprises: receiving assistance data indicating an expected time delay of the first PRS occasion relative to a symbol boundary; and determining a beginning of the first FFT window based on the expected time delay indicated by the assistance data.

Clause 35. The method of clause 34, where the assistance data is received from a gNodeB base station or a Location Management Function (LMF).

Clause 36. The method of clause 34 or 35, wherein the expected time delay is received as an expected Reference Signal Time Difference (RSTD) associated with a transmitter device that transmits the first PRS.

Clause 37. The method of any of clauses 31-36, further comprising: configuring the Rx chains such that an Rx signal or combined Rx signal corresponding to a subsequent occasion of the first PRS is processed by the Rx chain associated with the first set of antenna elements and not the Rx chain associated with the second set of antenna elements.

Clause 38. The method of any of clauses 31-37, wherein the first PRS and the second PRS are from transmission/reception points (TRPs) located at different distances from the UE.

Clause 39. The method of any of clauses 31-38, wherein the first PRS is from a serving cell, and wherein the second PRS is from a neighbor cell.

Clause 40. The method of any of clauses 31-39, further comprising: processing a separate Rx signal or combined Rx signal corresponding to the first PRS using an additional Rx chain associated with the first set of antenna elements; and processing a separate Rx signal or combined Rx signal corresponding to the second PRS using an additional Rx chain associated with the second set of antenna elements.

Clause 41. The method of any of clauses 31-40, further comprising: determining that the first PRS and the second PRS have similar center channel frequencies; and responsive to determining that the first PRS and the second PRS have similar center channel frequencies, allocating separate Rx chains for the first PRS and the second PRS.

Clause 42. A device comprising: a first set of antenna elements configured to generate an Rx signal or combined Rx signal corresponding to a first Positioning Reference Signal (PRS) during a first PRS occasion; a second set of antenna elements configured to generate an Rx signal or combined Rx signal corresponding to a second PRS, during a second PRS occasion that at least partially overlaps with the first PRS occasion; a plurality of receive (Rx) chains including: an Rx chain associated with the first set of antenna elements and configured to process the Rx signal or combined Rx signal corresponding to the first PRS; and an Rx chain associated with the second set of antenna elements and configured to process the Rx signal or combined Rx signal corresponding to the second PRS; and one or more processors configured to determine positioning measurements using: (i) results generated by the Rx chain associated with the first set of antenna elements based on processing the Rx signal or combined Rx signal corresponding to the first PRS and (ii) results generated by the Rx chain associated with the second set of antenna elements based on processing the Rx signal or combined Rx signal corresponding to the second PRS.

Clause 43. The device of clause 42, wherein: the device is configured to receive timing information associated with a serving or reference cell, the timing information indicating symbol boundaries; the Rx chain associated with the first set of antenna elements is configured to align a first Fast Fourier Transform (FFT) window to the first PRS occasion and without regard to the symbol boundaries, and further configured to perform a first FFT using the first FFT window; and the Rx chain associated with the second set of antenna elements is configured to align a second FFT window to the second PRS occasion and without regard to the symbol boundaries, and further configured to perform a second FFT using the second FFT window and in parallel with performing of the first FFT by the Rx chain associated with the first set of antenna elements.

Clause 44. The device of clause 42 or 43, wherein the first PRS occasion is aligned with a boundary of a first symbol, and wherein the second PRS occasion partially overlaps in time with the first PRS occasion and is not aligned with any symbol boundary.

Clause 45. The device of clause 43 or 44, wherein the device is configured to receive assistance data indicating an expected time delay of the first PRS occasion relative to a symbol boundary, and wherein to align the first FFT window to the first PRS occasion, the device is configured to determine a beginning of the first FFT window based on the expected time delay indicated by the assistance data.

Clause 46. The device of clause 45, where the assistance data is received from a gNodeB base station or a Location Management Function (LMF).

Clause 47. The device of clause 45 or 46, wherein the device is configured to receive the expected time delay as an expected Reference Signal Time Difference (RSTD) associated with a transmitter device that transmits the first PRS.

Clause 48. The device of any of clauses 42-47, wherein the one or more processors are configured to cause an Rx signal or combined Rx signal corresponding to a subsequent occasion of the first PRS to be processed by the Rx chain associated with the first set of antenna elements and not the Rx chain associated with the second set of antenna elements.

Clause 49. The device of any of clauses 42-48, wherein the transmitter devices are transmission/reception points (TRPs) located at different distances from the device.

Clause 50. The device of any of clauses 42-49, wherein the first PRS is received from a serving cell, and wherein the second PRS is received from a neighbor cell.

Clause 51. The device of any of clauses 42-50, wherein multiple Rx chains are associated with the first set of antenna elements and are each configured to process a separate Rx signal or combined Rx signal corresponding to the first PRS, and wherein multiple Rx chains are associated with the second set of antenna elements and are each configured to process a separate Rx signal or combined Rx signal corresponding to the second PRS.

Clause 52. The device of any of clauses 42-51, wherein the one or more processors are configured to: determine that the first PRS and the second PRS have similar center channel frequencies; and responsive to determining that the first PRS and the second PRS have similar center channel frequencies, allocate separate Rx chains for the first PRS and the second PRS.

Clause 53. A device comprising: a first set of antenna elements configured to generate an Rx signal or combined Rx signal corresponding to a first Positioning Reference Signal (PRS) during a first PRS occasion; a second set of antenna elements configured to generate an Rx signal or combined Rx signal corresponding to a second PRS, during a second PRS occasion that at least partially overlaps with the first PRS occasion; a plurality of receive (Rx) chains including an Rx chain associated with the first set of antenna elements and an Rx chain associated with the second set of antenna elements; means for configuring the Rx chain associated with the first set of antenna elements to process the Rx signal or combined Rx signal corresponding to the first PRS; means for configuring the Rx chain associated with the second set of antenna elements to process the Rx signal or combined Rx signal corresponding to the second PRS; and means for determining positioning measurements using: (i) results generated by the Rx chain associated with the first set of antenna elements based on processing the Rx signal or combined Rx signal corresponding to the first PRS and (ii) results generated by the Rx chain associated with the second set of antenna elements based on processing the Rx signal or combined Rx signal corresponding to the second PRS.

Clause 54. A non-transitory computer readable medium containing instructions that, when executed by one or more processors, cause the one or more processors to: process an Rx signal or combined Rx signal corresponding to a first Positioning Reference Signal (PRS), using an Rx chain associated with a first set of antenna elements; process an Rx signal or combined Rx signal corresponding to a second PRS, using an Rx chain associated with a second set of antenna elements separate from the first set of antenna elements, wherein the Rx signal or combined Rx signal corresponding to the first PRS is generated during a first PRS occasion, and wherein the Rx signal or combined Rx signal corresponding to the second PRS is generated during a second PRS occasion that at least partially overlaps with the first PRS occasion; and determine positioning measurements using: (i) results of the processing of the Rx signal or combined Rx signal corresponding to the first PRS and (ii) results of the processing of the Rx signal or combined Rx signal corresponding to the second PRS.

What is claimed is:

1. A method of determining positioning measurements using multiple receive (Rx) chains of a user equipment (UE), the method comprising performing the following by the UE:

processing an Rx signal or combined Rx signal corresponding to a first Positioning Reference Signal (PRS), using an Rx chain associated with a first set of antenna elements;

processing an Rx signal or combined Rx signal corresponding to a second PRS, using an Rx chain associated with a second set of antenna elements separate from the first set of antenna elements, wherein the Rx signal or combined Rx signal corresponding to the first PRS is generated during a first PRS occasion, and wherein the Rx signal or combined Rx signal corresponding to the second PRS is generated during a second PRS occasion that at least partially overlaps with the first PRS occasion; and determining the positioning measurements using: (i) results of the processing of the Rx signal or combined Rx signal corresponding to the first PRS and (ii) results of the processing of the Rx signal or combined Rx signal corresponding to the second PRS.

2. The method of claim 1, further comprising:

receiving timing information associated with a serving or reference cell, the timing information indicating symbol boundaries;

aligning a first Fast Fourier Transform (FFT) window to the first PRS occasion, using the Rx chain associated with the first set of antenna elements;

aligning a second FFT window to the second PRS occasion, using the Rx chain associated with the second set of antenna elements, wherein the first FFT window and the second FFT window are aligned without regard to the symbol boundaries; and performing a first FFT using the first FFT window in parallel with performing a second FFT using the second FFT window.

3. The method of claim 2, wherein the first PRS occasion is aligned with a boundary of a first symbol, and wherein the second PRS occasion partially overlaps in time with the first PRS occasion and is not aligned with any symbol boundary.

4. The method of claim 2, wherein aligning the first FFT window to the first PRS occasion comprises:

receiving assistance data indicating an expected time delay of the first PRS occasion relative to a symbol boundary; and determining a beginning of the first FFT window based on the expected time delay indicated by the assistance data.

5. The method of claim 4, where the assistance data is received from a gNodeB base station or a Location Management Function (LMF).

6. The method of claim 4, wherein the expected time delay is received as an expected Reference Signal Time Difference (RSTD) associated with a transmitter device that transmits the first PRS.

7. The method of claim 1, further comprising:

configuring the Rx chains such that an Rx signal or combined Rx signal corresponding to a subsequent occasion of the first PRS is processed by the Rx chain associated with the first set of antenna elements and not the Rx chain associated with the second set of antenna elements.

8. The method of claim 1, wherein the first PRS and the second PRS are from transmission/reception points (TRPs) located at different distances from the UE.

9. The method of claim 1, wherein the first PRS is from a serving cell, and wherein the second PRS is from a neighbor cell.

10. The method of claim 1, further comprising:

processing a separate Rx signal or combined Rx signal corresponding to the first PRS using an additional Rx chain associated with the first set of antenna elements; and processing a separate Rx signal or combined Rx signal corresponding to the second PRS using an additional Rx chain associated with the second set of antenna elements.

11. The method of claim 1, further comprising:

determining that the first PRS and the second PRS have similar center channel frequencies; and responsive to determining that the first PRS and the second PRS have similar center channel frequencies, allocating separate Rx chains for the first PRS and the second PRS.

12. A device comprising:

a first set of antenna elements configured to generate an Rx signal or combined Rx signal corresponding to a first Positioning Reference Signal (PRS) during a first PRS occasion;

a second set of antenna elements configured to generate an Rx signal or combined Rx signal corresponding to a second PRS, during a second PRS occasion that at least partially overlaps with the first PRS occasion;

a plurality of receive (Rx) chains including:

an Rx chain associated with the first set of antenna elements and configured to process the Rx signal or combined Rx signal corresponding to the first PRS; and an Rx chain associated with the second set of antenna elements and configured to process the Rx signal or combined Rx signal corresponding to the second PRS; and one or more processors configured to determine positioning measurements using: (i) results generated by the Rx chain associated with the first set of antenna elements based on processing the Rx signal or combined Rx signal corresponding to the first PRS and (ii) results generated by the Rx chain associated with the second set of antenna elements based on processing the Rx signal or combined Rx signal corresponding to the second PRS.

13. The device of claim 12, wherein:

the device is configured to receive timing information associated with a serving or reference cell, the timing information indicating symbol boundaries;

the Rx chain associated with the first set of antenna elements is configured to align a first Fast Fourier Transform (FFT) window to the first PRS occasion and without regard to the symbol boundaries, and further configured to perform a first FFT using the first FFT window; and the Rx chain associated with the second set of antenna elements is configured to align a second FFT window to the second PRS occasion and without regard to the symbol boundaries, and further configured to perform a second FFT using the second FFT window and in parallel with performing of the first FFT by the Rx chain associated with the first set of antenna elements.

14. The device of claim 13, wherein the first PRS occasion is aligned with a boundary of a first symbol, and wherein the second PRS occasion partially overlaps in time with the first PRS occasion and is not aligned with any symbol boundary.

15. The device of claim 13, wherein the device is configured to receive assistance data indicating an expected time delay of the first PRS occasion relative to a symbol boundary, and wherein to align the first FFT window to the first PRS occasion, the device is configured to determine a beginning of the first FFT window based on the expected time delay indicated by the assistance data.

16. The device of claim 15, where the assistance data is received from a gNodeB base station or a Location Management Function (LMF).

17. The device of claim 15, wherein the device is configured to receive the expected time delay as an expected Reference Signal Time Difference (RSTD) associated with a transmitter device that transmits the first PRS.

18. The device of claim 12, wherein the one or more processors are configured to cause an Rx signal or combined Rx signal corresponding to a subsequent occasion of the first PRS to be processed by the Rx chain associated with the first set of antenna elements and not the Rx chain associated with the second set of antenna elements.

19. The device of claim 12, wherein the transmitter devices are transmission/reception points (TRPs) located at different distances from the device.

20. The device of claim 12, wherein the first PRS is received from a serving cell, and wherein the second PRS is received from a neighbor cell.

21. The device of claim 12, wherein multiple Rx chains are associated with the first set of antenna elements and are each configured to process a separate Rx signal or combined Rx signal corresponding to the first PRS, and wherein multiple Rx chains are associated with the second set of antenna elements and are each configured to process a separate Rx signal or combined Rx signal corresponding to the second PRS.

22. The device of claim 12, wherein the one or more processors are configured to:

determine that the first PRS and the second PRS have similar center channel frequencies; and responsive to determining that the first PRS and the second PRS have similar center channel frequencies, allocate separate Rx chains for the first PRS and the second PRS.

23. A device comprising:

a first set of antenna elements configured to generate an Rx signal or combined Rx signal corresponding to a first Positioning Reference Signal (PRS) during a first PRS occasion;

a second set of antenna elements configured to generate an Rx signal or combined Rx signal corresponding to a second PRS, during a second PRS occasion that at least partially overlaps with the first PRS occasion;

a plurality of receive (Rx) chains including an Rx chain associated with the first set of antenna elements and an Rx chain associated with the second set of antenna elements;

means for configuring the Rx chain associated with the first set of antenna elements to process the Rx signal or combined Rx signal corresponding to the first PRS;

means for configuring the Rx chain associated with the second set of antenna elements to process the Rx signal or combined Rx signal corresponding to the second PRS; and means for determining positioning measurements using: (i) results generated by the Rx chain associated with the first set of antenna elements based on processing the Rx signal or combined Rx signal corresponding to the first PRS and (ii) results generated by the Rx chain associated with the second set of antenna elements based on processing the Rx signal or combined Rx signal corresponding to the second PRS.

24. A non-transitory computer readable medium containing instructions that, when executed by one or more processors, cause the one or more processors to:

process an Rx signal or combined Rx signal corresponding to a first Positioning Reference Signal (PRS), using an Rx chain associated with a first set of antenna elements;

process an Rx signal or combined Rx signal corresponding to a second PRS, using an Rx chain associated with a second set of antenna elements separate from the first set of antenna elements, wherein the Rx signal or combined Rx signal corresponding to the first PRS is generated during a first PRS occasion, and wherein the Rx signal or combined Rx signal corresponding to the second PRS is generated during a second PRS occasion that at least partially overlaps with the first PRS occasion; and determine positioning measurements using: (i) results of the processing of the Rx signal or combined Rx signal corresponding to the first PRS and (ii) results of the processing of the Rx signal or combined Rx signal corresponding to the second PRS.

* * * * *